(12) United States Patent
Onai et al.

(10) Patent No.: US 9,819,878 B2
(45) Date of Patent: Nov. 14, 2017

(54) MOVING-IMAGE PROCESSING DEVICE, MOVING-IMAGE PROCESSING METHOD, AND INFORMATION RECORDING MEDIUM

(75) Inventors: Rikio Onai, Chofu (JP); Makoto Okabe, Chofu (JP); Tatsuya Kurihara, Chofu (JP); Masahiro Sanjo, Shinagawa-ku (JP); Hiromi Hirano, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 50 days.

(21) Appl. No.: 14/361,332

(22) PCT Filed: Sep. 7, 2012

(86) PCT No.: PCT/JP2012/072988
§ 371 (c)(1),
(2), (4) Date: May 29, 2014

(87) PCT Pub. No.: WO2014/013627
PCT Pub. Date: Jan. 23, 2014

(65) Prior Publication Data
US 2014/0347560 A1    Nov. 27, 2014

(30) Foreign Application Priority Data

Jul. 20, 2012    (JP) .................................. 2012-161924

(51) Int. Cl.
*G06T 13/00* (2011.01)
*H04N 5/265* (2006.01)
(Continued)

(52) U.S. Cl.
CPC ............... *H04N 5/265* (2013.01); *G06T 7/50* (2017.01); *G06T 7/73* (2017.01); *G06T 13/00* (2013.01);
(Continued)

(58) Field of Classification Search
None
See application file for complete search history.

(56) References Cited

U.S. PATENT DOCUMENTS 5,087,981 A    2/1992    Ng et al.
6,151,009 A *  11/2000   Kanade ................. G06T 15/405
345/641

(Continued)

FOREIGN PATENT DOCUMENTS

JP    2009-80660 A    4/2009

OTHER PUBLICATIONS

Article on "2.5D" in the English version of the free online dictionary Wikipedia, at http://en.wikipedia.org/wiki/2.5D, aquired Jul. 18, 2012, 11 pages.

(Continued)

*Primary Examiner* — Ryan D McCulley
(74) *Attorney, Agent, or Firm* — Sughrue Mion, PLLC

(57) ABSTRACT

A moving-image processing device (101) synthesizes a first moving image and a second moving image. In the first moving image, a first object is drawn, and accompanied by first-object depth information. In the second moving image, a second object is drawn, and accompanied by second-object depth information. A moving image generator (105) generates a third moving image in which the first moving image and the second moving image are synthesized. A clash determiner (103) serving as an interference determiner refers to the first-object depth information and the second-object depth information to determine whether the first object and the second object in the third moving image satisfy interference conditions. If it is determined that the interference conditions are satisfied, a corrector (106) corrects the second moving image by performing a non-deforming transforma- (Continued)

tion in which the shape of the trajectory expressing movement in three-dimensional space over time is maintained.

20 Claims, 14 Drawing Sheets

(51) Int. Cl.
*G06T 13/80* (2011.01)
*H04N 5/272* (2006.01)
*H04N 13/00* (2006.01)
*G06T 7/73* (2017.01)
*G06T 7/50* (2017.01)

(52) U.S. Cl.
CPC ............ *G06T 13/80* (2013.01); *H04N 5/272* (2013.01); *H04N 13/004* (2013.01); *G06T 2207/10016* (2013.01); *G06T 2207/10028* (2013.01); *G06T 2207/20221* (2013.01); *G06T 2210/21* (2013.01)

(56) References Cited

U.S. PATENT DOCUMENTS

| | | | | |
|---|---|---|---|---|
| 6,456,289 | B1* | 9/2002 | O'Brien | G06T 13/20 345/473 |
| 6,738,066 | B1 | 5/2004 | Nguyen | |
| 8,433,094 | B1* | 4/2013 | Nguyen | G06F 3/011 382/103 |
| 2003/0117402 | A1 | 6/2003 | Hubrecht et al. | |
| 2006/0117356 | A1* | 6/2006 | Jojic | G06F 17/30811 725/88 |
| 2006/0149516 | A1 | 7/2006 | Bond et al. | |
| 2006/0200314 | A1* | 9/2006 | Ajioka | A63F 13/10 701/301 |
| 2008/0186330 | A1 | 8/2008 | Pendleton et al. | |
| 2008/0273041 | A1* | 11/2008 | Chang | G06T 13/80 345/522 |
| 2009/0015861 | A1 | 1/2009 | Ohta et al. | |
| 2010/0134501 | A1* | 6/2010 | Lowe | G06T 13/40 345/474 |
| 2010/0309973 | A1* | 12/2010 | Chien | H04N 21/23439 375/240.02 |
| 2011/0199302 | A1* | 8/2011 | Tossell | A63F 13/06 345/158 |
| 2011/0316972 | A1* | 12/2011 | Demas | H04N 13/0003 348/43 |
| 2012/0127158 | A1* | 5/2012 | Miyagi | G06T 15/20 345/419 |
| 2012/0176410 | A1* | 7/2012 | Meier | G06F 3/011 345/633 |
| 2013/0035916 | A1* | 2/2013 | Girard | G06T 19/20 703/6 |
| 2013/0215230 | A1* | 8/2013 | Miesnieks | G06T 19/006 348/46 |
| 2014/0002493 | A1 | 1/2014 | Mitchell et al. | |

OTHER PUBLICATIONS

International Search Report for PCT/JP2012/072988 dated Nov. 27, 2012.
Franck: "Simulating the Collision Avoidance Behavior of Pedestrians" (Dec. 28, 2011), pp. 1-7.
Loscos C et al: "Real-Time Shadows for Animated Crowds in Virtual Cities" (Nov. 15, 2001), pp. 85-92.
S. Kockara et al., "Collision Detection: A Survey" (Oct. 1, 2007), pp. 4046-4051; University of Arkansas.
Sharipov R.A., "Course of Differential Geometry: the textbook," Russian Federal Committee for Higher Education, Publication of Bashkir State University, ISBN 5-7477-0129-0. Dec. 21, 2004. 132 pages total.

* cited by examiner

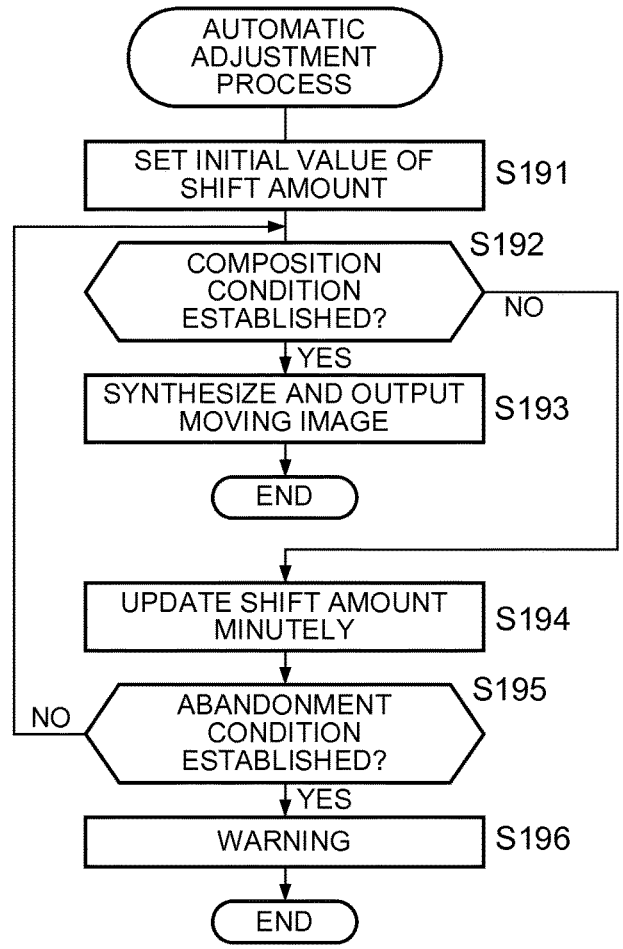
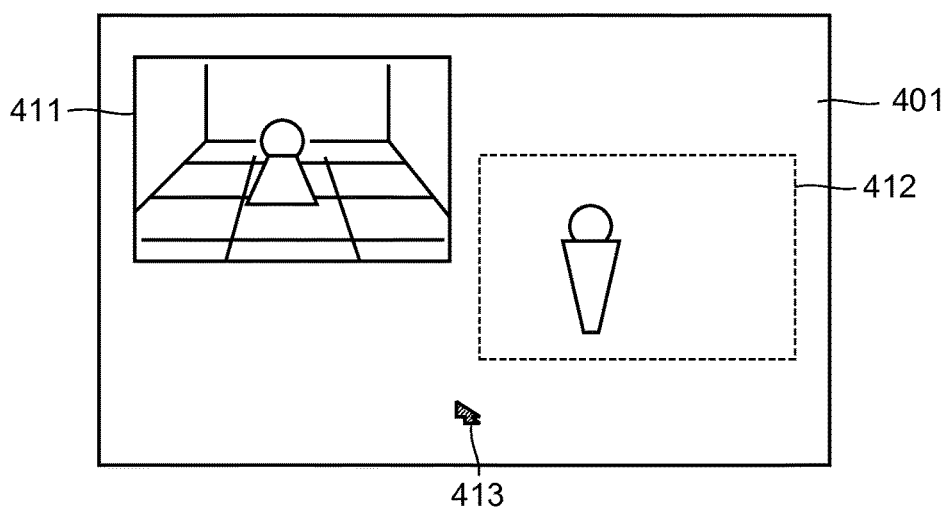

MOVING-IMAGE PROCESSING DEVICE, MOVING-IMAGE PROCESSING METHOD, AND INFORMATION RECORDING MEDIUM

CROSS REFERENCE TO RELATED APPLICATIONS

This application is a National Stage of International Application No. PCT/JP2012/072988, filed on Sep. 7, 2012, which claims priority from Japanese Patent Application No. 2012-161924, filed on Jul. 20, 2012, the contents of all of which are incorporated herein by reference in their entirety.

TECHNICAL FIELD

The present disclosure relates to a moving-image processing device, moving-image processing method, and non-transitory information recording medium for ensuring that objects do no satisfy interference conditions when objects accompanied by depth information and depicted in multiple moving images are compiled into one moving image.

BACKGROUND ART

Technology for creating images accompanied by depth information by acquiring the distance (depth or z-distance) between a photographed object and a camera has been known from before. Such images are often called 2.5-dimensional images (for example, see Non Patent Literature 1).

On the other hand, technology has been proposed for separating regions where virtually static backgrounds are depicted and regions where moving objects are depicted, from moving images depicting states in which an object's position, shape, color and/or the like change (for example, see Patent Literature 1).

By combining such technologies, it is possible to generate 2.5-dimensional moving images in which background depth and object depth are distinguished, after separating the background and the objects moving in the front thereof. In frames comprising the 2.5-dimensional images, the object's surface (object's front surface) as seen from the camera is depicted, and in pixels included in the depiction region where the object is depicted, the color of the surface part of the object corresponding to those pixels, along with the depth to that surface part (anterior-surface depth), are associated.

This kind of 2.5-dimensional moving image can be obtained using detection by a depth sensor simultaneously with shooting of the real world by a CCD camera, or shooting the real world with a stereo camera for stereopsis, finding parallax for each corresponding pixel and calculating depth from that parallax. Here, in a 2.5-dimensional moving image made by shooting the real world, the state of the object's surface (object's rear surface) that is not depicted in the frame is not photographed, and information about the depth to the rear surface is not known.

In addition, after creating a moving image expressing a state taking into consideration and causing movement and/or the like of an object in a virtual space, by adding only the anterior-surface depth in each pixel of the moving image, it is possible to obtain a 2.5-dimensional moving image. That this kind of transformation is accomplished is convenient for reasons such as consistency of the format and the 2.5-dimensional moving image being maintained and video editing becoming easier.

In the field of three-dimensional graphics, clash determination technology is widely used in order to prevent regions occupied by objects from mutually encroaching on each other so that objects moving in virtual space do not interfere, and to prevent situations in which one penetrates the other. Clash as referred to here naturally includes surface contact among objects, and also includes cases in which regions mutually occupied overlap and cases in which the distance between two objects is closer than a given threshold value even though the two are actually separated, thus having a broader meaning than the everyday definition.

CITATION LIST

Patent Literature

Patent Literature 1: Unexamined Japanese Patent Application Kokai Publication No. 2009-080660.

Non Patent Literature

Non Patent Literature 1: Article on "2.5D" in the English version of the free online dictionary Wikipedia, at http://en.wikipedia.org/wiki/2.5D, acquired Jul. 18, 2012.

SUMMARY OF INVENTION

Technical Problem

Here, when multiple objects depicted in differing 2.5-dimensional moving images are compiled into a single moving image, if multiple objects are depicted overlapping in the same region, which object should be given priority in depiction is determined based on the size of the depth. However, to begin with objects' interfering with each other, such as mutually encroaching or penetrating each other, is unnatural in a final moving image.

Furthermore, in order to make synthesis of moving images appear more natural, it is desirable for objects to maintain a prescribed positional relationship with each other even when the objects do not mutually interfere. For example, synthesizing a moving image in which an object that is a floor is depicted and a moving image in which an object that is a dancing dancer is depicted, it is desirable to impose position conditions so that the object that is the dancer just barely approaches the object that is the floor in order for the moving image to appear natural.

Accordingly, when multiple moving images are compiled, measures have been sought to ensure that objects do not satisfy interference conditions with each other by implementing a translation, a rotation or scaling or by implementing a non-deforming transformation with time shifted, so that the trajectories along which objects depicted in the moving images are moving in three-dimensional space are not deformed.

In consideration of the foregoing, it is an objective of the present disclosure to provide a moving-image processing device, moving-image processing method, and non-transitory information recording medium for ensuring that objects do not satisfy interference conditions when objects accompanied by depth information and depicted in multiple moving images are compiled into one moving image.

Solution to Problem

The moving-image processing device of the present disclosure is a moving-image processing device for synthesizing a first moving image and a second moving image, wherein a first object is depicted in the first moving image and is accompanied by depth information of the first object, and a second object is depicted in the second moving image and is accompanied by depth information of the second object, the moving-image processing device comprising:

a moving image generator for generating a third moving image synthesizing the first moving image and the second moving image;

an interference determiner for determining whether or not the first object and the second object satisfy an interference condition in the third moving image, by referencing the depth information of the first object and the depth information of the second object; and a corrector for correcting the second moving image by applying a non-deforming transformation that maintains a shape of a trajectory expressing movement within three-dimensional space with the passing of time, when it is determined that the interference condition is satisfied.

In addition, the moving-image processing device according to the present disclosure can be comprised such that:

the non-deforming transformation is a time shift, translation, rotation, scaling or a combination of these, with the time length of the time shift, translation amount, rotation amount, or scaling ratio in three-dimensional space, or a combination of these, as a transformation parameter; and the moving-image processing device further comprises an initial value setter for setting an initial value of the transformation parameter; and the corrector applies the non-deforming transformation by the transformation parameter, and updates the transformation parameter so that the interference condition is not satisfied.

In addition, the moving-image processing device according to the present disclosure can be comprised such that: the interference condition is satisfied if the first object and the second object clash.

In addition, the moving-image processing device according to the present disclosure can be comprised such that the corrector repeats updating of the transformation parameter until the first time it is determined that the first object and the second object do not clash.

In addition, the moving-image processing device according to the present disclosure can be comprised such that the corrector repeats updating of the transformation parameter until the first time "it is determined that the first object and the second object do not clash and it is determined that if the next update is done, the first object and the second object will clash."

In addition, the moving-image processing device according to the present disclosure can be comprised such that the corrector updates the transformation parameter within a prescribed correction range so that the elapsed time until the interference condition is for the first time satisfied increases.

In addition, the moving-image processing device according to the present disclosure can be comprised such that:

the interference determiner calculates a clash amount indicating the degree of clash between the transformed object and the first object; and the repeat controller updates the transformation parameter within a prescribed range so that the clash amount declines.

In addition, the moving-image processing device according to the present disclosure can be comprised such that the clash amount is the sum of the volumes in which a shape of the first object estimated based on the depth information of the first object in each frame and a shape of the first object estimated based on the depth information of the transformed object determined based on the depth information of the second object overlap.

In addition, the moving-image processing device according to the present disclosure can be comprised such that the clash amount is the sum of the areas in which an area in which the first object should be depicted in each frame and an area in which the transformed object should be depicted overlap.

In addition, the moving-image processing device according to the present disclosure can be comprised such that the moving image generator obtains a three-dimensional position where a representative point of the second object is positioned, from a position within a frame where a representative point is depicted in the frame and a depth position of a representative point determined from depth information of the second object, and obtains a transformed position by applying a congruent transformation of three-dimensional space on the three-dimensional position, and obtains a drawing position where the transformed position should be drawn within the frame, and obtains the transformed moving image by implementing a translation transformation based on a difference between the position within the frame and the drawing position obtained, and applying a scaling transformation based on a ratio of the depth position and the depth of the transformed position.

The moving-image processing method according to the present disclosure is a moving-image processing method for synthesizing a first moving image and a second moving image, wherein a first object is depicted in the first moving image and is accompanied by depth information of the first object, and a second object is depicted in the second moving image and is accompanied by depth information of the second object, the moving-image processing method comprising:

a moving image generation procedure for generating a third moving image synthesizing the first moving image and the second moving image;

an interference determination procedure for determining whether or not the first object and the second object satisfy an interference condition in the third moving image, by referencing the depth information of the first object and the depth information of the second object; and a correction procedure for correcting the second moving image by applying a non-deforming transformation that maintains a shape of a trajectory expressing movement within three-dimensional space with the passing of time, when it is determined that the interference condition is satisfied.

The non-transitory computer-readable non-transitory information recording medium according to the present disclosure is a non-transitory computer-readable non-transitory information recording medium on which is recorded a program for synthesizing a first moving image and a second moving image, wherein a first object is depicted in the first moving image and is accompanied by depth information of the first object, and a second object is depicted in the second moving image and is accompanied by depth information of the second object, the program causing a computer to function as:

a moving image generator for generating a third moving image synthesizing the first moving image and the second moving image;

an interference determiner for determining whether or not the first object and the second object satisfy an interference condition in the third moving image, by referencing the depth information of the first object and the depth information of the second object; and a corrector for correcting the second moving image by applying a non-deforming transformation that maintains a shape of a trajectory expressing movement within three-dimensional space with the passing of time, when it is determined that the interference condition is satisfied.

The above-described program can be recorded on a computer-readable non-transitory non-transitory information recording medium such as a compact disc, flexible disk, hard disk, magneto-optical disc, digital video disc, magnetic tape, semiconductor memory, and/or the like. The non-transitory information recording medium can be distributed and sold independent of a computer.

Furthermore, the above-described program can be distributed and sold via a transmission medium such as a computer communication network and/or the like, independent of a computer on which the program is executed.

Advantageous Effects of Invention

With the present disclosure, it is possible to provide a moving-image processing device, moving-image processing method, and non-transitory information recording medium for ensuring that objects do not satisfy interference conditions when objects accompanied by depth information and depicted in multiple moving images are compiled into one moving image.

BRIEF DESCRIPTION OF DRAWINGS

FIG. 8 is a flowchart showing the flow of control of an automatic adjustment process;

FIG. 9A is an explanatory drawing showing the state of the screen prior to the start of dragging;

DESCRIPTION OF EMBODIMENTS

Below, the preferred embodiments of the present disclosure are described. The preferred embodiments are for explanatory purposes and do not limit the scope of the present disclosure. Accordingly, one skilled in the art could apply an embodiment in which various elements or all elements herein are substituted by equivalents thereto, but such embodiments are also included within the scope of the present disclosure.

The moving-image processing device according to the preferred embodiments described below is realized by a computer executing a program. The program is read into a temporary memory device such as a RAM (Random Access Memory) and/or the like from a non-transitory memory device such as a ROM (Read Only Memory), a hard disk and/or the like. A CPU (Central Processing Unit) successively interprets programs read into the RAM, reads and writes data among various memory devices and accomplishes calculation processes on data. In addition, the CPU controls interaction with input and output devices such as keyboard, mouse, touch panel, display and network interface, and/or the like, under the program's control.

However, the moving-image processing device according to the present disclosure is not limited to being realized by a computer that executes a program. For example, it is possible to realize the same functions by using a special electronic circuit for image processing, an FPGA (Field Programmable Gate array), DSP (Digital Signal Processor) and/or the like.

In the field of three-dimensional graphics, interference between objects is called a clash. In everyday language, a clash means objects violently colliding, the mutual surfaces making contact and in some cases the shapes of the objects deforming, but when speaking of interference of objects or clash of objects, the meaning shall include when the surfaces make contact, cases where regions within the three-dimensional space occupied by an object is encroached on and penetrated, and cases where even through the objects are separated the distance is sufficiently close, and/or the like. In the embodiments below, the phrase "clash" is used in place of the term "interference" to facilitate understanding.

(Relationship Between a 2.5-Dimensional Moving Image and Objects)

Figure 1:
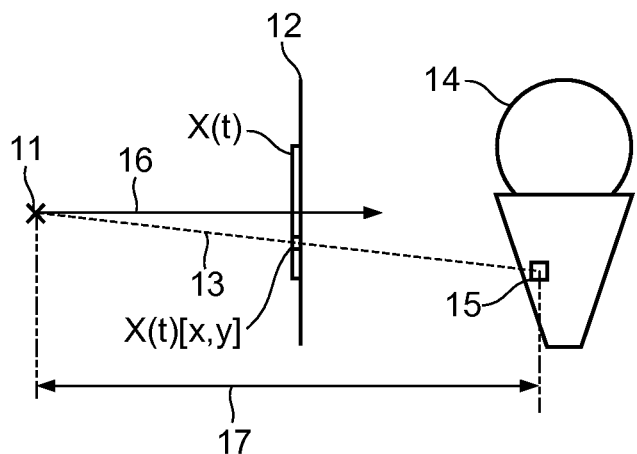
FIG. 1 is an explanatory drawing showing the relationship between an object depicted in a 2.5-dimensional moving image and the elements thereof.

Below, notation for expressing an object depicted in a 2.5-dimensional moving image is organized to facilitate understanding. FIG. 1 is an explanatory drawing showing the relationship between an object depicted in a 2.5-dimensional moving image and the elements thereof. The explanation below makes reference to this drawing.

In the explanation below, the phrase "2.5-dimensional moving image" is appropriately abbreviated as "moving image" to facilitate understanding.

A frame played back at an elapsed time t from the starting point of playback (classically, this is expressed by frame number) among frames included in a given moving image X is notated as X(t).

In the pixel coordinate system fixed for each frame, in frame X(t) the pixel positioned at the coordinate value x in the horizontal direction and the coordinate value y in the vertical direction is notated as X(t)[x,y].

That the coordinate value x in the horizontal direction and the coordinate value y in the vertical direction are effective values in each frame of the moving image X is notated as [x,y]∈X. That is to say, [x,y] means the position of a pixel.

FIG. 1 illustrates a state in which the condition of an object positioned in the virtual space is depicted in a frame of the moving image is seen from directly to the side, using three-dimensional graphics technology, but it is possible to conceive of similar conditions existing even when the real world is photographed with a camera.

As shown in the drawing, when from a shooting point 11 in the space a half line 13 toward the pixel X(t)[x,y] in the frame X(t) positioned on a projection surface 12 encounters a clash point 15 of the surface of an object 14, the state of the encountered clash point 15 is depicted at the pixel (X)t[x,y]. This is typical perspective projection.

As described above, this drawing is the state of shooting as seen from directly to the side. Accordingly, in this drawing, the projection surface 12 is expressed by a straight line.

The shooting point 11 corresponds to the position of the camera or observation position, and the distance between the shooting point 11 and the projection surface 12 is determined by the focal length of the lens and the units of pixel length. In addition, the shooting direction 16 is the direction of a perpendicular line from the shooting point 11 toward the projection surface 12.

Below, the color of the pixel X(t)[x,y] and the anterior-surface depth are notated as X(t)[x,y].color and X(t)[x,y].fore.

X(t)[x,y].color is determined based on the color and state of writing at the clash point 15, and the distance between the shooting point 11 and the clash point 15, and/or the like. X(t)[x,y].color expresses a coordinate value in each color space, such as RGB, CYMK, HSV and/or the like, and conversion of the coordinate value between color spaces is formularized. In addition, it would also be fine to add an α value indicating transparency to the X(t)[x,y].color.

X(t)[x,y].fore expresses the depth distance between the part corresponding to the clash point 15 of the object 14 depicted at the pixel X(t)[x,y], and the shooting point 11. As the depth distance, it is typical to utilize a length 17 of a component in the shooting direction 16 of a vector from the shooting point 11 to the clash point 15 (corresponding to the so-called "Z distance"), but as an approximation thereof, it would be fine to utilize the distance from the shooting point 11 to the clash point 15.

The depth distance can be expressed in various unit systems. When a pixel comprises a square, if the length of the side of the pixel is taken as the unit, it is possible to normalize depth in multiple moving images. Below, the explanation assumes that depth has been normalized.

In general, in the moving image X a background is depicted in addition to moving objects. The background can be thought of as a substantially unmoving object.

If each frame of the moving image is analyzed using the technology disclosed in Patent Literature 1 and/or the like, it is possible to identify whether a background is depicted or a moving object is depicted at the pixel X(t)[x,y].

Below, a case will be considered in which identifying numbers have been assigned to identified objects in order to facilitate understanding. The identifying number of the object expressing the background is 0, and the identifying numbers of other objects are assigned as 1, 2, 3 . . . .

Furthermore, the identifying number of an object a part of which is depicted at the pixel X(t)[x,y] is notated as X(t)[x,y].id, and the maximum value of the identifying numbers of objects appearing in the moving image X is notated as X.maxid.

If the identifying numbers of objects appearing in the moving image X are 0, 1, 2, 3, . . . , N, then X.maxid=N.

In the moving image X, if only the pixels X(t)[x,y] satisfying the condition X(t)[x,y].id≠0 are extracted, information about only objects (information excluding the background) can be obtained. In addition, in order to obtain a moving image of only the $i^{th}$ object, it would be fine to extract only pixels X(t)[x,y] satisfying the condition X(t)[x,y].id=i. These correspond to moving images for chroma key composition using blueback in conventional moving image technology.

As a result of accomplishing the above-described extraction, in pixels that have ceased to be targets of processing, the assumption will be that a negative value has been given as an identifying number, in order to facilitate understanding. That is to say, if X(t)[x,y].id<0, the pixel X(t)[x,y] will be interpreted as a transparent pixel. Here, "transparent" means corresponding to blueback in chroma key composition.

Based on this interpretation, it is possible to think of a negative value being set as X(t)[x,y].id when [x,y] ∈X is not established. Below, the explanation will continue for the case in which negative values are set as .id for pixels that are not targets of processing and "pixels" in positions outside the frame of the moving image, in order to facilitate understanding.

(Various Types of Conversions for 2.5-Dimensional Moving Images)

Below, conversion methods for creating a different moving image from a given moving image are described. Among this kind of conversion method are the following:

(1) Translation up, down, left or right along a frame of the moving image;

(2) Scaling of the moving image;

(3) Translation in the depth direction of the moving image;

(4) Rotation of the moving image about the horizontal axis, the vertical axis or the depth axis;
(5) Displacement of the moving image in the time direction;
(6) Selection of only specific objects from the moving image;
(7) Synthesis overlaying a different moving image on a given moving image.

These are explained in order below.

First, consider translation up, down, left or right along a frame of the moving image. If a moving image Y is obtained by translating the moving image X by p in the horizontal direction and q in the vertical direction within the frame, then:

$$Y(t)[x+p,y+q]=X(t)[x,y], \text{ and}$$

$$Y(t)[x,y]=X(t)[x-p,y-q].$$

Here, for the above-described equalities, values assigned to each pixel such as .color and .fore and/or the like, all have equivalent meaning.

Below, the moving image obtained by translating the moving image X by p in the horizontal direction and by q in the vertical direction within the frame is notated as move (p,q,X).

Next, consider scaling of the moving image. In a transparent projection, depicting as c times as large means that the depth has become 1/c times and background points have become closer. Accordingly, if the moving image Y is the enlargement of the moving image X c times within the frame, for other than the .fore assigned to each pixel, $$Y(t)[c \times x, c \times y]=X(t)[x,y],$$

that is to say, $$Y(t)[x,y]=X(t)[x/c,y/c].$$

In addition, for .fore assigned to each pixel, $$Y(t)[c \times x, c \times y].\text{fore}=X(t)[x,y].\text{fore}/c,$$

that is to say, $$Y(t)[x,y].\text{fore}=X(t)[x/c,y/c].\text{fore}/c.$$

Below, the moving image obtained by enlarging the moving image X c times within the frame is notated as scale(c,X).

Next, consider translation of the moving image in the depth direction. When the moving image Y is obtained by objects shot in the moving image X being made more distant by the depth direction r, the depth distance of X(t)[x,y] changes from X(t)[x,y].fore to X(t)[x,y].fore+r. That is to say, the depth distance becomes (X(t)[x,y].fore+r)/X(t)[x,y].fore=k times.

In transparent projection, if the distance to a shooting point becomes k times, the size depicted on the projection surface is enlarged or reduced to 1/k times.

Accordingly, for other than the .fore assigned to each pixel, $$Y(t)[x/k,y/k]=X(t)[x,y],$$

and for .fore, $$Y(t)[x/k,y/k].\text{fore}=X(t)[x,y].\text{fore}+r.$$

Below, the moving image obtained by translating the moving image X by r in the depth direction is notated as push(r,X).

Furthermore, consider rotation of the moving image about the horizontal axis, the vertical axis or the depth axis. If the moving image Y is obtained by rotating the moving image X by θ about the horizontal axis, elements other than .fore become:

$$Y(t)[x,y]=X(t)[x,X(t)[x,y].\text{fore} \times \cos\theta - y \times \sin\theta],$$

and for .fore, $$Y(t)[x,y].\text{fore}=X(t)[x,y].\text{fore} \times \sin\theta + y \times \cos\theta$$

is established.

Similarly, if the moving image Y is obtained by rotating the moving image X by φ about the vertical axis, elements other than .fore become:

$$Y(t)[x,y]=X(t)[X(t)[x,y].\text{fore} \times \cos\phi \times x \times \sin\phi, y],$$

and for .fore, $$Y(t)[x,y].\text{fore}=X(t)[x,y].\text{fore} \times \sin\phi + x \times \cos\phi$$

is established.

In addition, when the moving image Y is obtained by rotating the moving image X by ψ about the depth axis, $$Y(t)[x,y]=X(t)[x \times \cos\psi - y \times \sin\psi, x - \sin\psi + y \times \cos\psi]$$

is established.

Below, the moving images obtained by the respective rotations are notated as rothor(θ, X), rotver(φ, X) and rotdep(ψ, X).

When these transformations are accomplished the coordinate values of the pixels are not integer values and at times a hole occurs in the coordinate values. In such cases, the values of the .color and .fore and/or the like assigned to each pixel are interpolated and anti-aliasing is accomplished, and for .id, it is possible to adopt a method such as utilizing a value at the grid point closest to that coordinate, or to find at what position the boundary where .id changes is positioned through interpolation and to determine .id based on that boundary.

Pixels that are outside the scope of the frame of the moving image due to a translation and/or the like may be thought of as transparent pixels, so it would be fine to set .id to a negative value as above.

Next, consider translations of the moving image in the time direction. If the moving image Y is found by shifting the moving image X by d in time, $$Y(t)[x,y]=X(t-d)[x,y]$$

is established.

Below, the moving image in which the time of the moving image X is shifted by d is notated as shift(d,X).

Furthermore, consider a process for selecting only a specific object from a moving image. If a moving image y depicts only object with the $i^{th}$ identification number in the moving image X, for elements other than .id, $$Y(t)[x,y]=X(t)[x,y], \text{ if } X(t)[x,y].\text{id}=i$$

is established.
In addition, for .id, if $$Y(t)[x,y].\text{id}=1, \text{ if } X(t)[x,y].\text{id}=i \text{ and } i>0;$$

$$Y(t)[x,y].\text{id}=0, \text{ if } X(t)[x,y].\text{id}=i \text{ and } i=0;$$

$$Y(t)[x,y].\text{id}=-1, \text{ otherwise,}$$

then it is possible to minimize to the extent possible the maximum value Y.maxid of the identification numbers in the moving image Y.

Below, a moving image depicting only the object having identification number i depicted in the moving image X is notated as select(i,X).

Finally, consider the process of superimposing a different moving image on a given moving image. If there is no clash between objects depicted in moving images X and Y, by superimposing an object other than the background of the moving image Y on the moving image X (it would be fine to include the background, and it would also be fine to include only objects other than the background), a moving image Z is obtained in which objects depicted in the moving image X and objects depicted in the moving image Y are compiled into one.

In the moving image Z, for other than .id, $$Z(t)[x,y]=X(t)[x,y], \text{ if } Y(t)[x,y].\text{id}\leq 0;$$

$$Z(t)[x,y]=X(t)[x,y], \text{ if } X(t)[x,y].\text{fore}<Y(t)[x,y].\text{fore};$$

$$Z(t)[x,y]=Y(t)[x,y], \text{ otherwise}$$

is established.
In addition, for .id, if $$Z(t)[x,y].\text{id}=X(t)[x,y].\text{id}, \text{ if } Y(t)[x,y].\text{id}\leq 0;$$

$$Z(t)[x,y].\text{id}=X(t)[x,y].\text{id}, \text{ if } X(t)[x,y].\text{fore}< Y(t)[x,y].\text{fore};$$

$$Z(t)[x,y].\text{id}=Y(t)[x,y].\text{id}+X.\text{maxid, otherwise}$$

then it is possible to avoid overlapping identification numbers of objects.

In addition, of the integers 1, 2, ..., Z.maxid, if there is one that does not appear as a value of Z(t)[x,y].id, it is possible to minimize Z.maxid by shifting the .id of the subsequent objects.

Below, the moving image obtained by superimposing objects other than the background of the moving image Y on the moving image X is notated as superimpose(Y,X).

When the above-described processes move, scale, push, rothor, rotver, rotdep, select, superimpose and/or the like are accomplished by computer, it is possible to use a calculator function possessed by a CPU (Central Processing Unit), and high-speed calculation is also possible by using a processor for graphics processing, and/or the like.

In scale and push, scaling and translation in the depth direction are considered to be centered at the origin, and in rothor, rotver and rotdep, the assumption is that the axis of rotation passes through the origin.

Accordingly, when the desire is to accomplish scaling or translation in the depth direction centered at an arbitrary position [p,q] within the moving image X, it would be fine to first translate [p,q] up, down, left or right to the origin, then accomplish scaling or translation in the depth direction and then accomplish the reverse translation up, down, left or right. That is to say, it would be fine to use:

$$\text{move}(p,q,\text{scale}(c,\text{move}(-p,-q,X)));$$

$$\text{move}(p,q,\text{push}(r,\text{move}(-p,-q,X))).$$

When the position of the axis of rotation is to be shifted up, down, left or right or in the depth direction, the axis of rotation is first translated in the up, down, left or right direction or in the depth direction so as to pass through the origin, the rotation is accomplished, and following this a reverse translation is accomplished in the up, down, left or right direction or in the depth direction.

Besides this, in a transformation such as a scale or push and/or the like when the depth is translated, it would be fine to correct the brightness or intensity and/or the like of .color in accordance with the degree thereof.

Normalization of the moving image can also be accomplished based on settings and/or the like at the time of shooting, but it is also possible for this to be set in accordance with user desires or to be accomplished automatically.

In the case of settings by the user, first the height or width of the moving image is simply scaled based on the user instructions and/or the like, and by adjusting the resolution the size of objects depicted in the image become as desired. With "scale", the depth distance of the corresponding pixels are multiplied by a coefficient corresponding to the enlargement ratio, but when normalizing, the depth distance of the corresponding pixels is used without change.

Following this, the user selects a coefficient and the depth distance of each pixel is multiplied by this coefficient.

When the attempt is made to generate a moving image Z in which the object i and the object j are depicted together under the situation in which an object i is depicted in the moving image X and an object j is depicted in the moving image Y, it is often preferable for the size of the object i and the size of the object j to be substantially equivalent, and for the depth of the object i and the depth of the object j to be substantially equivalent. When such prerequisites are established, automatic normalization is possible.

That is to say, the moving image Y is simply scaled so that the average area and average height and/or the like of the region in which the object j is depicted in the moving image Y match the corresponding values of the object i in the moving image X, so that the moving image Z is obtained. That is to say, for all values including .fore, $$Z(t)[x,y]=Y(t)[x/c,y/c].$$

Furthermore, the depth in the moving image Z is multiplied by a coefficient so that the average depth of the object j in the moving image Z and the average depth of the object i in the moving image X match, thereby obtaining a moving image W. That is to say, for other than .fore, $$W(t)[x,y]=Z(t)[x,y],$$

and for .fore, $$W(t)[x,y].\text{fore}=k\times Z(t)[x,y].\text{fore}.$$

If c and k are automatically set so that the above conditions are satisfied, the moving image W is obtained by normalized the moving image Y so that the object j corresponds to the object i. Naturally, as described above, it would be fine to accomplish normalization by setting c and k in accordance with the user's desires.

Above, notation of various characteristic amounts of the moving images and various types of transformations were described, but these notations and transformations are intended to facilitate understanding. In particular, it is possible to express .color, .fore, .id and/or the like through other formats. Even when methods or transformations equivalent to this are utilized in various formats used in moving-image processing, naturally this is included within the technical scope of the present disclosure.

First Preferred Embodiment

This preferred embodiment is used to determine whether or not an object i having an identification number i in the moving image X and an object j having an identification number j in the moving image Y clash when the moving image Y is superimposed on the moving image X.

Consider the following conditions as a case in which a clash between the object i and the object j can be determined relatively easily.

First, there is a case in which there is an instant during which the anterior surface of the object i (the surface depicted in the moving image X) and the anterior surface of the object j (the surface depicted in the moving image Y) occupy the same three-dimensional position. That is to say, for any t, x and y, if $$X(t)[x,y].\text{id}=i;$$

and $$Y(t)[x,y].\text{id}=j;$$

the position [x,y] is contained duplicated in the area where the object i should be depicted and the area where the object j should be depicted.

In this position [x,y], if $$X(t)[x,y].\text{fore}=Y(t)[x,y].\text{fore}$$

is established, it is determined that the object i and the object j clash.

With this method, the assumption is that the objects i and j are sheet-like objects with nothing on the rear surface, not possessing depth and comprising only the shape of the anterior surface.

For the anterior surfaces of the objects i and j to have the same depth at a position projected onto a given pixel X(t)[x,y] means that the anterior surfaces of the objects i and j are overlapping at that position. Hence, in this case it is possible to determine that the two clash.

It is also possible to extend this determination standard in the time direction. Below, the assumption is for a case in which the elapsed time t is expressed by the frame number, that is to say that the frame at time t+1 follows the frame at time t.

At any t, x and y, if $$X(t)[x,y].\text{id}=X(t+1)[x,y].\text{id}=i;$$

$$Y(t)[x,y].\text{id}=Y(t+1)[x,y].\text{id}=j;$$

$$X(t)[x,y].\text{fore}<Y(t)[x,y].\text{fore; and}$$

$$X(t+1)[x,y].\text{fore}>Y(t+1)[x,y].\text{fore}$$

are established, it can be thought that from time t to time t+1, the object j has come from the back of the object i to the front. In addition, if $$X(t)[x,y].\text{id}=X(t+1)[x,y].\text{id}=i;$$

$$Y(t)[x,y].\text{id}=Y(t+1)[x,y].\text{id}=j;$$

$$X(t)[x,y].\text{fore}>Y(t)[x,y].\text{fore; and}$$

$$X(t+1)[x,y].\text{fore}<Y(t+1)[x,y].\text{fore}$$

are established, it can be thought that from time t to time t+1, the object i has come from the back of the object j to the front.

Hence, when this kind of "slipping" occurs, it is determined that a clash of objects has occurred.

With a clash determination for objects i and j under these conditions, the assumption is that the objects i and j are composed of the shapes of only the anterior surfaces thereof. When the objects are thin plate-shaped objects, it can be thought that the thickness of the objects is zero and that the anterior surface of the object and the rear surface of the object coincide. Accordingly, by accomplished clash determination through this kind of method, an easy, swift determination is possible.

Figure 2A:
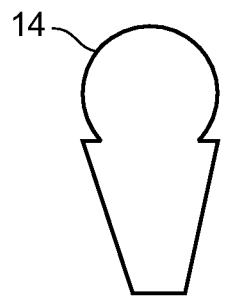
FIG. 2A is a cross-sectional view of an object.
Figure 2B:
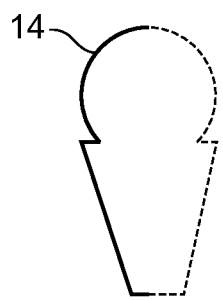
FIG. 2B is a cross-sectional view showing the anterior surface of the object.

FIG. 2A is a cross-sectional view of the object 14 shown in FIG. 1, and FIG. 2B is a cross-sectional view showing the anterior surface of the object 14. The explanation below makes reference to these drawings.

As shown in FIG. 2A, the object 14 has depth and the cross-section thereof has an expanse.

However, when the object 14 is expressed through information contained in a 2.5-dimensional moving image, as shown in FIG. 2B the shape thereof is a planar object comprising only the anterior surface of the object 14. Because this drawing is a cross-sectional view, a planar object is expressed by a curved line.

Accordingly, in order to accomplish a clash determination among objects more accurately, it is necessary to set or estimate the shape of the rear surface of the object 14 from information about the planar object as shown in FIG. 2B.

Here, the depth to the anterior surface of the object 14 is obtained from information incident to the 2.5-dimensional moving image, so in order to learn the depth of the object 14, it would be fine for the depth to the rear surface of the object 14 to be obtained.

Below, the depth to the rear surface of an object depicted at the pixel X(t)[x,y] at time t in the moving image X is notated as X(t)[x,y].back, and a method of obtaining this rear-surface depth is described.

In a first method, the user sets in advance the distance between the anterior surface and the rear surface for each object.

That is to say, if the distance (thickness) between the anterior surface and the rear surface is set as a constant thick(i) for an object i in the moving image X, then the result is:

$$X(t)[x,y].\text{back}=X(t)[x,y].\text{fore}+\text{thick}(X(t)[x,y].\text{id}).$$

Figure 2C:
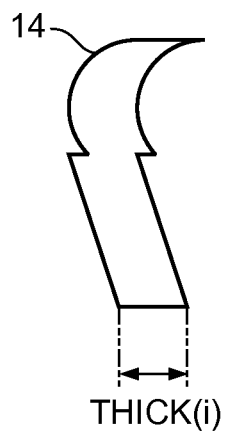
FIG. 2C is a cross-sectional view of an object the shape of whose rear surface is estimated by making the thickness constant.

FIG. 2C is a cross-sectional view of an object for which the shape of the rear surface is estimated by taking the thickness to be a constant. As shown in the drawing, the rear surface of the object 14 is the shape of the anterior surface of the object 14 that has undergone a translation in the shooting direction 16.

In addition, there is a method of determining a representative anterior-surface depth for the object i and taking as the rear-surface depth a value found by adding to this the value of thick(i).

The following can be conceived as a representative anterior-surface depth repfore(X,t,i) of the object i at a given time t:

(1) Utilizing the maximum value of the anterior-surface depth of the object i:

$$\text{repfore}(X,t,i)=\max_{x,y;X(t)[x,y].\text{id}=i} X(t)[x,y].\text{fore}$$

(2) Utilizing the average value of the anterior-surface depth of the object i:

$$\text{repfore}(X,t,i)=\text{avg}_{x,y;X(t)[x,y].\text{id}=i} X(t)[x,y].\text{fore}$$

Here, max and avg mean the maximum value and the average value of the values of the main part when, in the subscript part, the variables arranged in front of the semicolon are caused to change within the range satisfying the conditions placed after the semicolon. When "constantly satisfied" is utilized as the condition, only the variables are notated as the subscript.

That is to say, this means listing combinations of x,y satisfying X(t)[x,y].id=i under a given X, t and i in the above-described (1) and (2), finding the value of X(t)[x,y].fore for each of those combinations and finding the maximum value or average value thereof.

If the repfore(X,t,i) thus established is used, the rear-surface depth of the pixel X(t)[x,y] when the object i is depicted at the pixel X(t)[x,y] (i=X(t)[x,y].id) can be established such that:

$$X(t)[x,y].back=repfore(X,t,i)+thick(i).$$

or, $$X(t)[x,y].back=max[repfore(X,t,i)+thick(i), X(t)[x,y].fore].$$

Here, max[ . . . ] means the maximum value of the values arranged within the brackets.

Figure 2D:
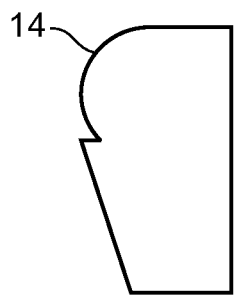
FIG. 2D is a cross-sectional view of an object the shape of whose rear surface is estimated by finding a representative anterior-surface depth of the object and setting the value found by adding thickness to this as the rear-surface depth.

FIG. 2D is a cross-sectional view of an object for which the shape of the back surface of the object is estimated by finding a representative anterior-surface depth of the object and adding thickness thereto to find the rear-surface depth. As shown in the drawing, the rear surface of the object 14 is a plane perpendicular to the shooting direction 16, and the object 14 resembles a columnar shape extending in the shooting direction 16.

In addition, there is a method of approximating the rear surface by establishing a representative point of the object i at the time t, and creating a spherical surface centered at that representative point.

First, the pixel number area(X,t,i) of the region where the object i is depicted at the time t in the moving image X is found as follows:

$$area(X,t,i)=\Sigma_{x,y;X(t)[x,y].id=i}1$$

Here, the subscript of $\Sigma$ has the same meaning as with max and avg.

A horizontal coordinate xc(X,t,i) and a vertical coordinate yc(X,t,i) of the representative point of the object i at the time t are established as follows:

$$xc(X,t,i)=\Sigma_{x,y;X(t)[x,y].id=i}x/area(X,t,i);$$

$$yc(X,t,i)=\Sigma_{x,y;X(t)[x,y].id=i}y/area(X,t,i).$$

In addition, a width w(X,t,i) and a height h(X,t,i) of the region in which the object i is depicted at the time t in the moving image X are established as follows:

$$w(X,t,i)=max_{x,y;X(t)[x,y].id=i}x-min_{x,y;X(t)[x,y].id=i}x;$$

$$h(X,t,i)=max_{x,y;X(t)[x,y].id=i}y-min_{x,y;X(t)[x,y].id=i}y.$$

There are various methods of establishing the diameter D(X,t,i) of the spherical surface, such as those below:

$$D(X,t,i)=max\ [w(X,t,i),h(X,t,i)];$$

$$D(X,t,i)=(w(X,t,i)^2+h(X,t,i)^2)^{1/2};$$

$$D(X,t,i)=area(X,t,i)^{1/2};$$

$$D(X,t,i)=max_{x,y;X(t)[x,y].id=i}((x-xc(X,t,i))^2+(y-yc(X,t,i))^2)^{1/2};$$

$$D(X,t,i)=avg_t area(X,t,i)^{3/2}/area(X,t,i)$$

Here, $avg_t\ area(X,t,i)$ means the time average for the region in which the object i is depicted in the moving image X. Accordingly, $avg_t\ area(X,t,i)^{3/2}$ corresponds to the approximate value of the volume the object i occupies, and when this is divided by area(X,t,i), an approximate value of the depth length is obtained.

Now, once the diameter D(X,t,i) is established, the depth coordinate zc(X,t,i) of the representative point can be established as follows:

$$zc(X,t,i)=X(t)[xc(X,t,i),yc(X,t,i)].fore+D(X,t,i)/2$$

In addition, it would be fine to simply establish this as follows:

$$zc(X,t,i)=X(t)[xc(X,t,i),yc(X,t,i)].fore.$$

Whereupon, if the rear-surface depth of the pixel X(t)[x,y] when the object i is depicted at the pixel X(t)[x,y] (i=X(t)[x,y].id) is established by:

$$X(t)[x,y].back=max[zc(X,t,i)+[max[(D(X,t,i)/2)^2-(x-xc(X,t,i))^2-(y-yc(X,t,i))^2]0]^{1/2},X(t)[x,y].fore],$$

the spherical surface can be better approximated, and if $$X(t)[x,y].back=max\ [zc(X,t,i)+D,X(t)[x,y].fore]$$

is established, a cylinder can be better approximated.

Figure 2E:
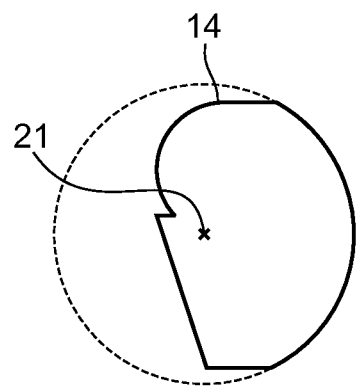
FIG. 2E is a cross-sectional view of an object the rear surface shape of which is estimated to be a spherical surface.

FIG. 2E is a cross-sectional drawing of an object the shape of whose rear surface is assumed to be a spherical surface. In the example shown in this drawing, the rear surface of the object 14 is a spherical surface centered at a representative point 21, but from the anterior surface of the object 14 to the spherical surface the shape more closely resembles the shape of a cylinder extending in the shooting direction 16.

To this point, methods for setting and estimating the rear-surface depth of a moving object have been described, but it would be fine to think of the rear-surface depth as ∞ for objects corresponding to the background. That is to say, when $$X(t)[x,y].id=0$$

is established, then $$X(t)[x,y].back=\infty.$$

The occupancy zone in the depth direction occupied in the pixel X(t)[x,y] by the object X(t)[x,y].id depicted at the pixel X(t)[x,y] in the moving image X at the time t extends from the anterior-surface depth X(t)[x,y].fore to the rear-surface depth X(t)[x,y].back.

If there is overlapping in the occupancy zone from the anterior-surface depth to the rear-surface depth of two objects depicted at the same pixel position, those two objects are clashing.

Accordingly, for any t, x, y:

$$X(t)[x,y].id=i;$$

$$Y(t)[x,y].id=j,$$

and if any of the four relationships:

$$X(t)[x,y].fore \leq Y(t)[x,y].fore \leq X(t)[x,y].back; \quad (1)$$

$$X(t)[x,y].fore \leq Y(t)[x,y].back \leq X(t)[x,y].back; \quad (2)$$

$$Y(t)[x,y].fore \leq X(t)[x,y].fore \leq Y(t)[x,y].back; \quad (3)$$

$$Y(t)[x,y].fore \leq X(t)[x,y].back \leq Y(t)[x,y].back. \quad (4)$$

is established, when the moving image X and the moving image Y overlap, it is possible to determine that the object i depicted in the moving image X and the object j depicted in the moving image Y clash.

Below, the amount of overlap in the two occupancy zones is notated as overlap(X,Y,t,x,y). If none of (1) to (4) above is satisfied, overlap(X,Y,t,x,y)=0, and if overlap(X,Y,t,x,y)>0, objects i and j clash.

Specifically, in the case of (1) above, overlap($X,Y,t,x,y$)=min [$X(t)[x,y]$.back,$Y(t)[x,y]$.back]−$Y(t)[x,y]$.fore, in the case of (2) above overlap($X,Y,t,x,y$)=$Y(t)[x,y]$.back−max [$X(t)[x,y]$.fore, $Y(t)[x,y]$.fore], in the case of (3) above, overlap($X,Y,t,x,y$)=min [$X(t)[x,y]$.back,$Y(t)[x,y]$.back]−$X(t)[x,y]$.fore, and in the case of (4) above, overlap($X,Y,t,x,y$)=$X(t)[x,y]$.back−max [$X(t)[x,y]$.fore, $Y(t)[x,y]$.fore].

Here, min[ . . . ] is the opposite of max [ . . . ] and returns the minimum value of the values in the brackets.

When any of (1) to (4) above is established and overlap (X,Y,t,x,y)=0, it is possible to think of the objects i and j as not being separated but being mutually in contact. Accordingly, it is possible to distinguish between a clash in which the two mutually encroach on each other and a clash in which the surfaces touch.

In addition, it would be fine in the clash determination to not use the above-described occupancy zone itself but to find out whether or not there is an overlap by slightly broadening the occupancy zone by adding a margin to the upper limit and lower limit thereof. In this case, by causing a margin to be added to the clash determination of the objects i and j, the objects i and j are determined to be clashing (or in danger thereof) if not separated by a certain amount of distance.

On the other hand, if the above-described margin is negative, it is possible to permit clashes with slight encroaching. This is suitable when the object is elastic and indentations are assumed, and/or the like.

Figure 3:
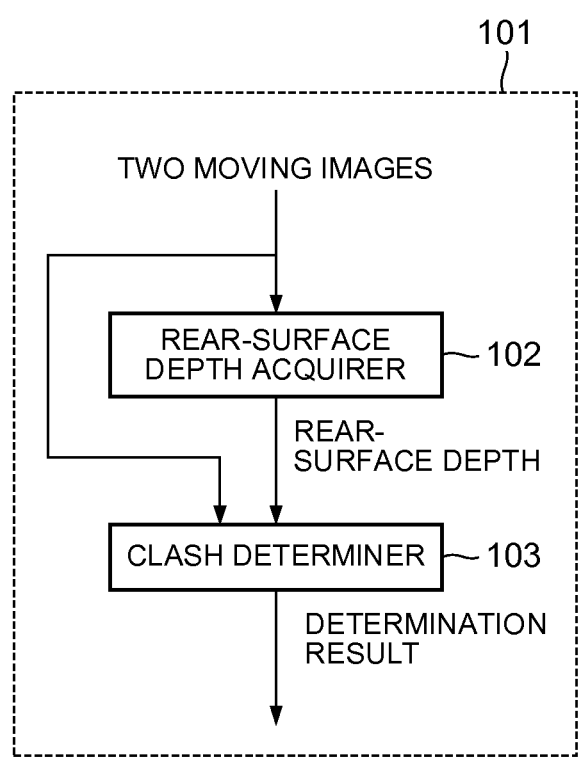
FIG. 3 is an explanatory drawing showing a summary composition of elements accompanying clash determination, in a moving-image processing device.

FIG. 3 is an explanatory drawing showing the summary composition of elements for accomplishing a clash determination, in the moving-image processing device according to this preferred embodiment.

As shown in this drawing, the elements for accomplishing a clash determination within the moving-image processing device 101 comprise a rear-surface depth acquirer 102 and a clash determiner 103.

The moving-image processing device 101 takes the first moving image X and the second moving image Y as targets of processing. For example, (a) as the first moving image X, a 2.5-dimensional image shooting a dancer dancing in the real world is utilized, (b1) as the second moving image Y, a moving image expressing a character dancing with no background is utilized, and (b2) as the second moving image Y, a moving image shot so as to express another user dancing and then the other user has accomplished editing and removed all background information so that the other user is dancing with no background is utilized.

The moving-image processing device 101 in this preferred embodiment ultimately synthesizes a third moving image in which a dancer is dancing together with a character or another user.

Consequently, first the moving-image processing device 101 determines a clash between the first object i depicted in the first moving image X and the second object j depicted in the second moving image Y that should be superimposed on the first moving image X. The moving-image processing device 101 is typically realized by executing a program on a computer.

Here, the first moving image X is accompanied by a first anterior-surface depth of the first object i on the side depicted in the first moving image X, and the second moving image Y is accompanied by a second anterior-surface depth of the second object j on the side depicted by the second moving image Y.

Using the above notation, if the first object i is depicted at a pixel at position [x,y] in the frame X(t) at time t contained in the first moving image X, then X(t)[x,y].id=i and the first anterior-surface depth is X(t)[x,y].fore.

The first moving image X may comprise a moving object alone or may include background. In the former case, an object with i>0 is utilized as the first object, and in the latter case, an object with i≥0 is utilized as the first object.

In addition, if the second object j is depicted at a pixel at position [x,y] in a frame Y(t) at time t contained in the second moving image Y, then Y(t)[x,y].id=j and the second anterior-surface depth is Y(t)[x,y].fore.

Objects that are the target of clash determination in the second moving image Y do not include the background. That is to say, as the second object, objects with j>0 are utilized.

First, the rear-surface depth acquirer 102 acquires the first rear-surface depth of the first object i on the side not depicted in the first moving image X, and the second rear-surface depth of the second object j on the side not depicted in the second moving image Y.

If the above-described notation is used, the rear surface acquirer 102 finds the first rear-surface depth X(t)[x,y].back through the above-described method for the time t and position [x,y] satisfying X(t)[x,y].id=i. In addition, the rear surface acquirer 102 finds the second rear-surface depth Y(t)[x,y].back through the above-described method for the time t and position [x,y] satisfying Y(t)[x,y].id=j.

On the other hand, the clash determiner 103 functions as an interference determiner for determining interference among objects. Furthermore, the clash determiner 103 determines that the first object and the second object clash if the first drawing area where the first object i should be depicted and the second drawing area where the second object j should be depicted overlap as a result of the first moving image X and the second moving image Y overlapping, and the first occupancy zone from the first anterior-surface depth to the first rear-surface depth of the first object i and the second occupancy zone from the second anterior-surface depth to the second rear-surface depth of the second object j overlapping in an overlap area where the first drawing area and the second drawing area overlap.

If the above-described notation is used, the first drawing area at a given time t is the set of positions [x,y] satisfying X(t)[x,y].id=i, and the second drawing area at a given time t is the set of positions [x,y] satisfying Y(t)[x,y].id=j. If the common part of these sets is not the empty set, then the first drawing area and the second drawing area overlap at the time t, and the common part of these sets correspond to the overlap area at the time t.

For a position [x,y] that is an element of the overlap area at the time t, clearly:

$X(t)[x,y]$.id=$i$;

$Y(t)[x,y]$.id=$j$ are established.

At this position [x,y], the first object i occupies the first occupancy zone from X(t)[x,y].fore to X(t)[x,y].back, as the depth. In addition, the first object j occupies the second occupancy zone from Y(t)[x,y].fore to Y(t)[x,y].back.

When the first occupancy zone and the second occupancy zone overlap, that is to say when the second anterior-surface depth or the second rear-surface depth is included in the first occupancy zone or the first anterior-surface depth or the first rear-surface depth is included in the second occupancy zone, it is determined that the first object i and the second object j clash at the time t and position [x,y].

In the above-described explanation, if the first drawing area in which the first object i is depicted and the second drawing area in which the second object j is depicted overlap in the frame at time t, a clash determination for the first object i and the second object j in the frame at the time t is accomplished using information about the rear-surface depth.

Accordingly, in order to confirm that a clash does not exist in a moving image as a whole, it would be good to accomplish the above-described clash determination by setting successive times for all frames in the first moving image X and the second moving image Y.

Figure 4:
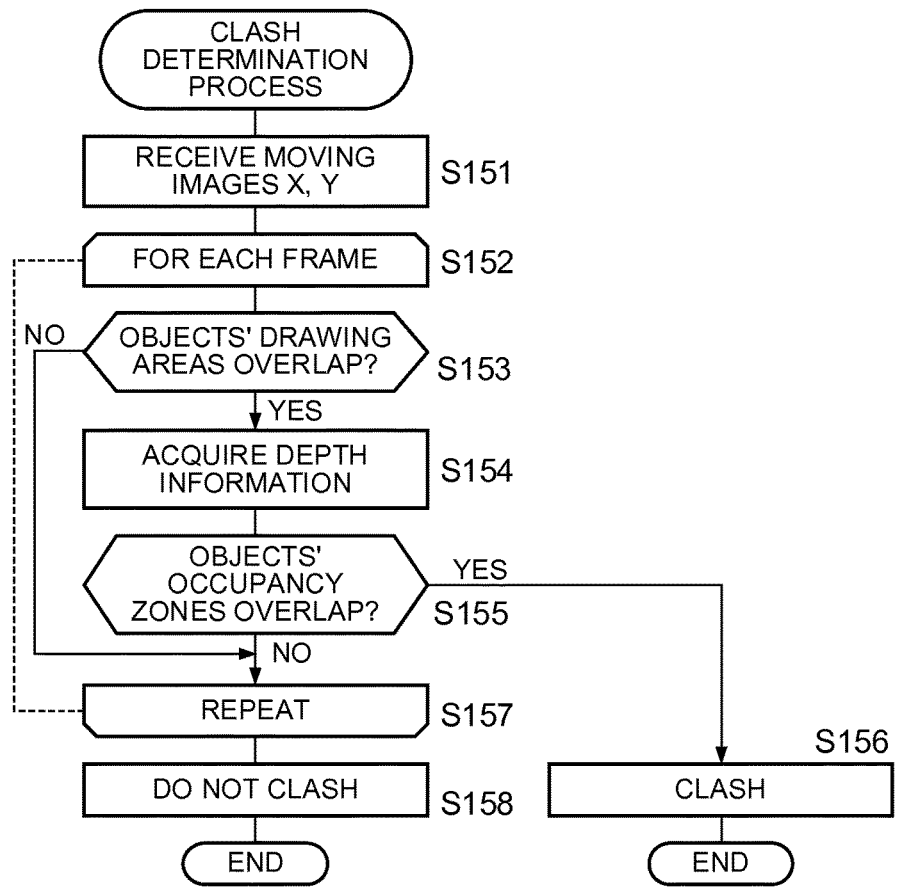
FIG. 4 is a flowchart showing the flow of the clash determination process.

FIG. 4 is a flowchart showing the flow of the clash determination process according to this preferred embodiment. Below, the clash determination process executed by the moving-image processing device 101 according to this preferred embodiment is described with reference to this drawing.

First, the moving-image processing device 101 receives the first moving image X and the second moving image Y that are targets of clash determination (step S151). Objects are depicted in the first moving image X and the second moving image Y, and object depth information is appended.

Next, a process of scanning frames of the first moving image X and second moving image Y in order from the start is repeated (step S152).

That is to say, in the frame currently being scanned, a determination is made as to whether or not an area in which an object is depicted in the first moving image X and an area in which an object is depicted in the second moving image Y overlap (step S153). If there is no overlap (step S153: No), the process proceeds to step S157 and the process is repeated.

If there is overlap (step S153: Yes), depth information about the object in the first moving image X for which there is overlap in that drawing region (corresponding to the above-described "first object"), and depth information about the object in the second moving image Y (corresponding to the above-described "second object") are acquired (step S154).

Furthermore, a determination is made as to whether or not there is an overlap in the occupancy zones of the objects obtained from the depth information (step S155). If there is no overlap, the process proceeds to step S157 and the process is repeated.

If there is an overlap (step S155: Yes), a determination result to the effect that the object depicted in the first moving image X and the object depicted in the second moving image Y clash is output (step S156), and the process then concludes.

When repeating of steps S152 to S157 concludes, a determination result to the effect that the object depicted in the first moving image X and the object depicted in the second moving image Y do not clash is output (step S158), and the process then concludes.

In the above description, to facilitate understanding the assumption is that only one first object is depicted in the first moving image X and only one second object is depicted in the second moving image Y, but when there are multiple objects, it would be fine to repeat the same process for each object.

In addition, in the above-description, a determination of overlapping of occupancy zones was accomplished based on depth information and overlapping of drawing areas for each frame, but when there are numerous frames, it is possible to accomplish suitable sampling.

For example, if a method is utilized in which initially it is possible to determine whether or not the first drawing area and the second drawing area overlap by selecting frames while skipping with equal spacing, and when there is an overlap, to stop sampling the frames before and after, it is possible to save calculating time needed in making a clash determination for the moving images as a whole.

In general, when it is not determined that "at any time and at any position, any of the objects depicted in the first moving image X and any of the objects depicted in the second moving image Y clash", that is to say when no clashes at all are generated, no contradiction arises in the front and back relationship of objects even if the second moving image Y is superimposed on the first moving image X. Accordingly, it is possible to find the third moving image superimpose(Y,X) with the second moving image Y superimposed on the first moving image X.

On the other hand, when it is determined that "at any time and at any position, any of the objects depicted in the first moving image X and any of the objects depicted in the second moving image Y clash," it is not possible to superimpose the first moving image X and the second moving image Y. Accordingly, a scheme such as that disclosed below is necessary.

Second Preferred Embodiment

This preferred embodiment devises a user interface when superimposing by shifting the second moving image Y to the first moving image X through a drag-and-drop operation and/or the like using a mouse.

With this preferred embodiment, in order to facilitate understanding a case will be assumed in which through the user's drag-and-drop operation, a translation amount up, down, left or right is specified in order to shift and superimpose the second moving image Y on the first moving image X. However, the operation system of this preferred embodiment is not necessarily limited to drag-and-drop, for it is also possible to replace drag-and-drop through utilization of various specified input operations, such as a slide action on a touch screen, or twice repeating a click operation, and/or the like.

Figure 5A:
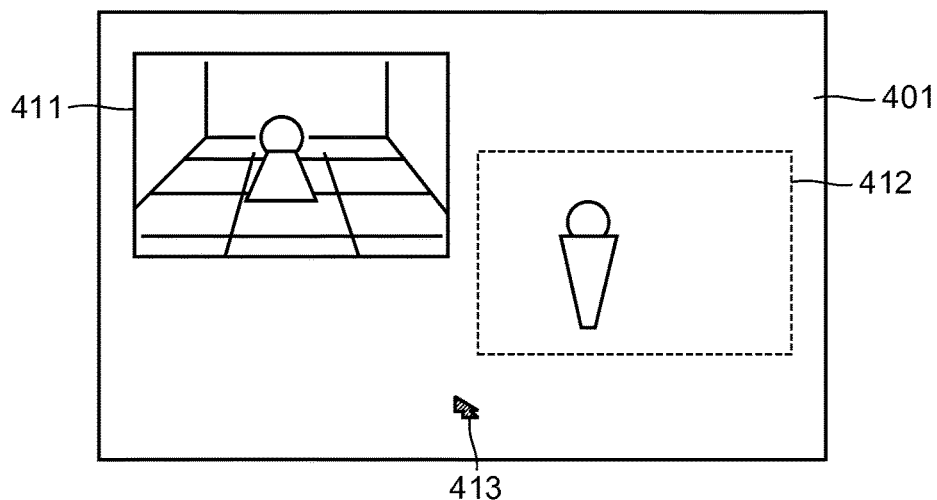
FIG. 5A is an explanatory drawing showing the state of the screen prior to the start of dragging.
Figure 5B:
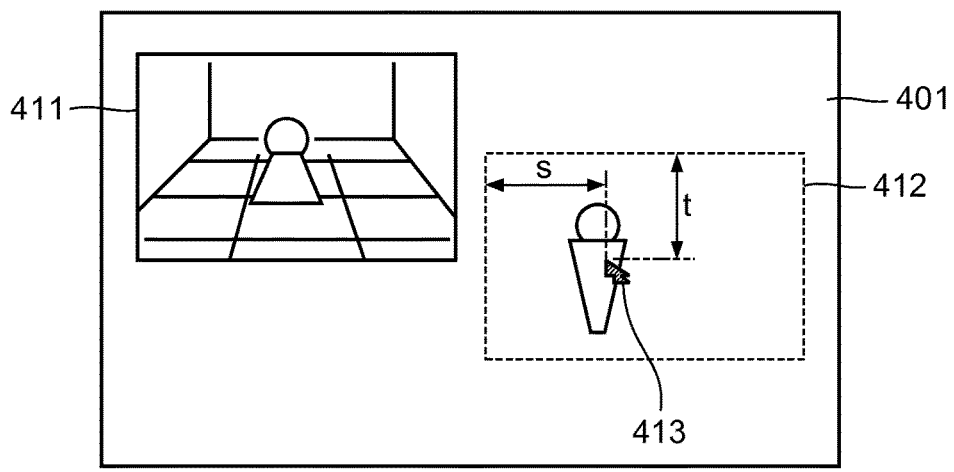
FIG. 5B is an explanatory drawing showing the state of the screen at the point in time when dragging starts.
Figure 5C:
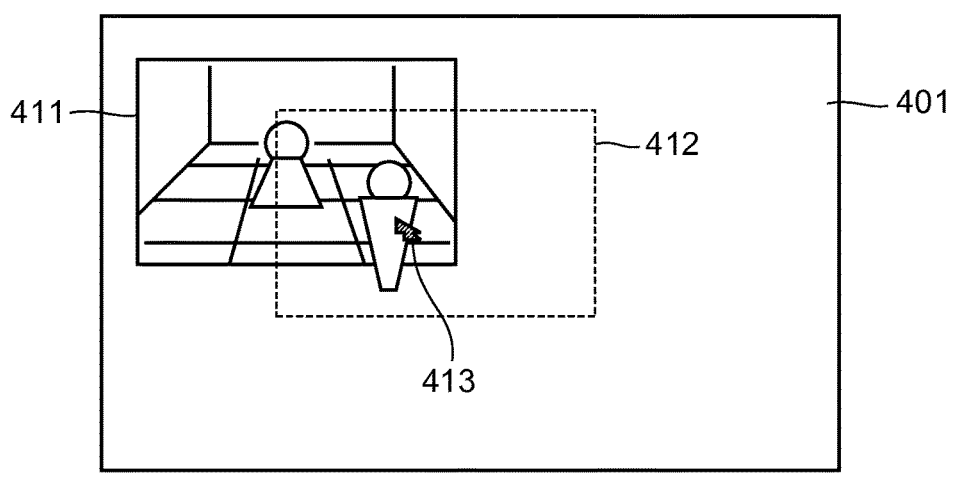
FIG. 5C is an explanatory drawing showing the state of the screen at a point in time during dragging.
Figure 5D:
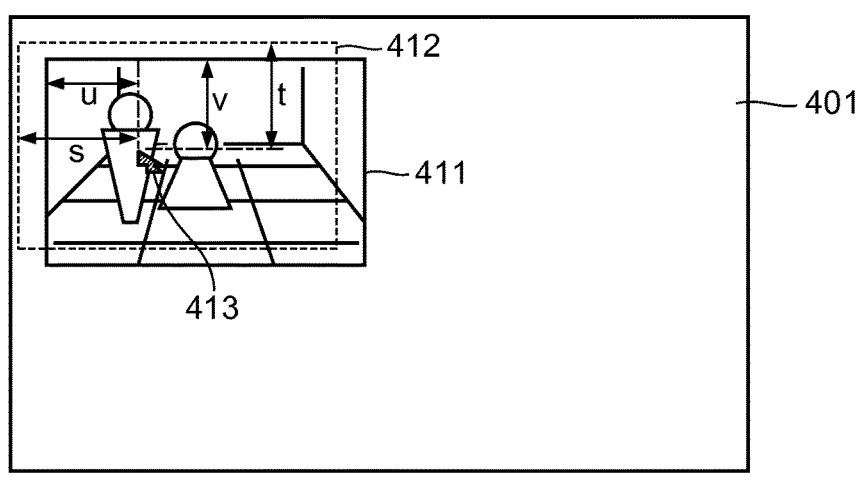
FIG. 5D is an explanatory drawing showing the state of the screen at a point in time when the image has been dropped.

FIG. 5A is an explanatory drawing showing the state of the screen before the drag is started, FIG. 5B is an explanatory drawing showing the state of the screen at a point in time when the drag is started, FIG. 5C is an explanatory drawing showing the state of the screen at a point in time during the drag and FIG. 5D is an explanatory drawing showing the state of the screen at a point in time when the drop is done.

Figure 6:
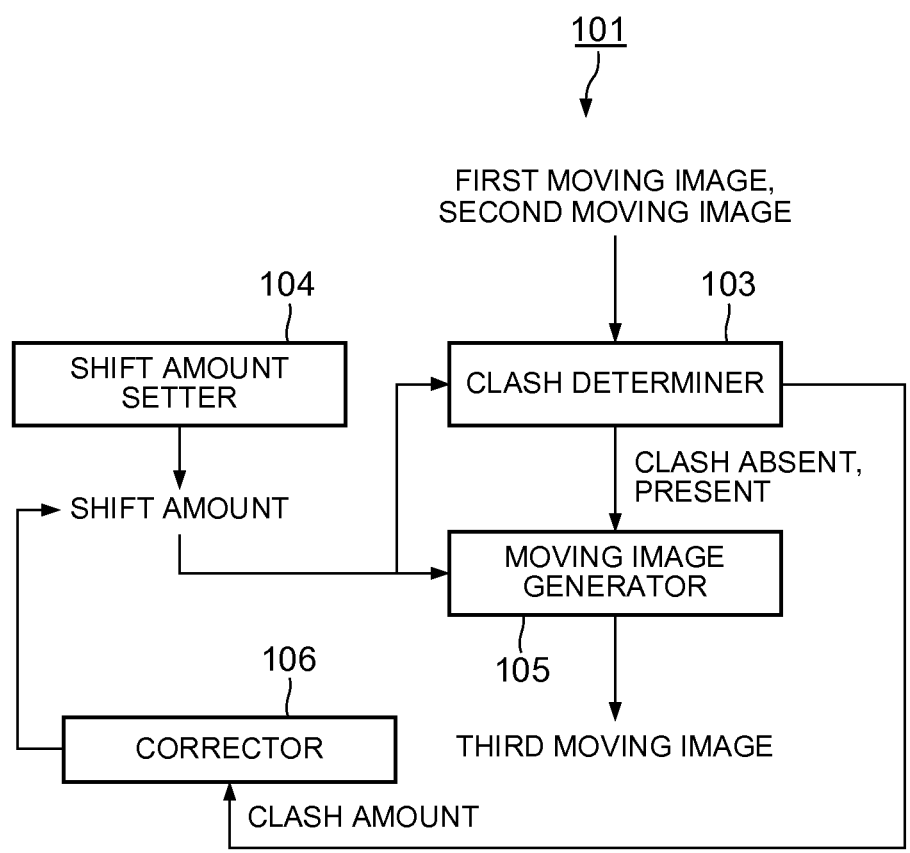
FIG. 6 is an explanatory drawing showing the summary composition of the part according to a drag-and-drop process of the moving-image processing device.
Figure 7:
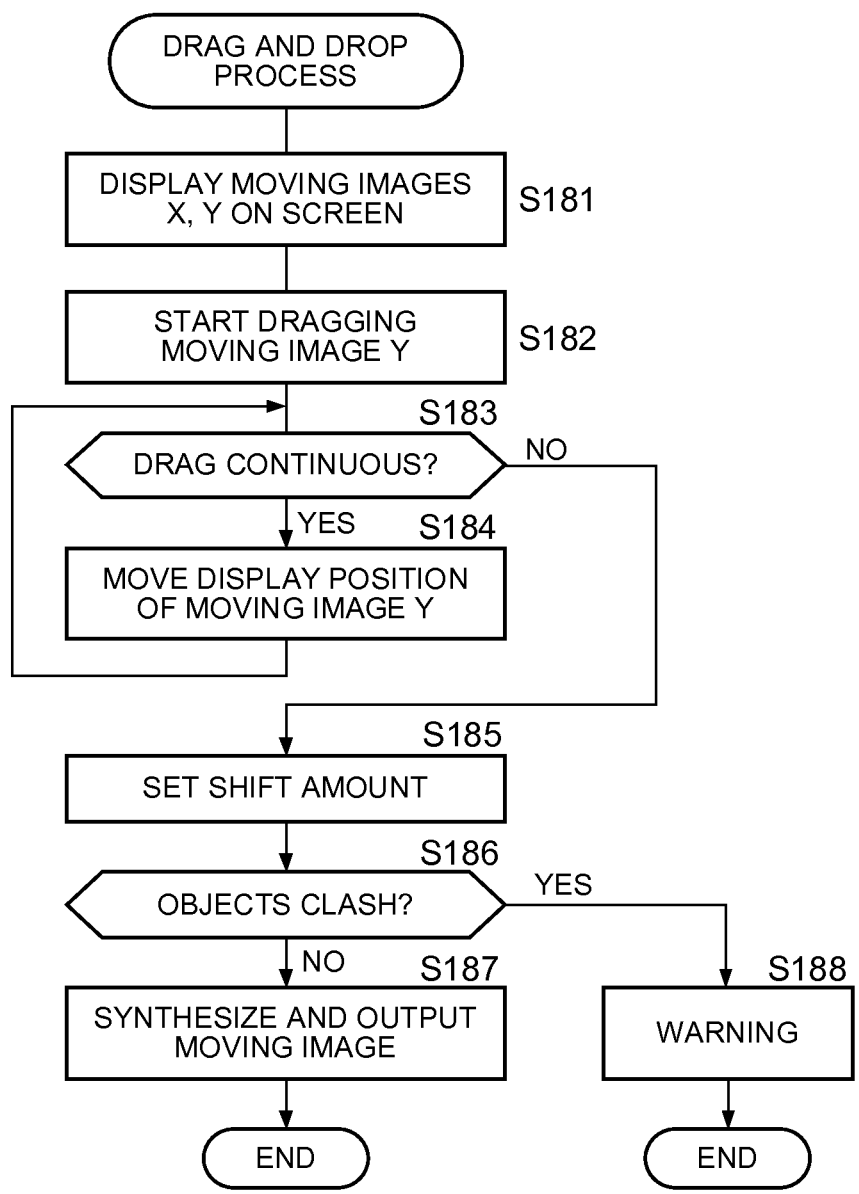
FIG. 7 is a flowchart showing the flow of control of the drag-and-drop process.

In addition, FIG. 6 is an explanatory drawing showing the summary composition of parts of the moving-image processing device 101 related to the drag-and-drop process. FIG. 7 is a flowchart showing the flow of control of the drag-and-drop process executed by the moving-image processing device 101 according to this preferred embodiment. The explanation below makes reference to these drawings.

In the drag-and-drop process according to this preferred embodiment, in the moving-image processing device 101, a slide amount setting 104 and a moving image generator 105 act based on the user's drag-and-drop operation.

The moving-image processing device 101, when sliding and superimposing the second moving image Y on the first moving image X, is provided with an interference determiner for determining whether or not position conditions are satisfied so that the positional relationship of objects satisfies prescribed position conditions.

However, in this preferred embodiment, in order to utilize a clash of objects not occurring as a position condition, the above-described clash determiner 103 is utilized as the interference determiner, and the determination result thereof is used. In this drawing, the rear-surface depth acquirer 102 in front of the clash determiner 103 is omitted from the drawing.

As described below, as a position condition, in addition to objects not interfering, that is to say, interference conditions not being satisfied, it is possible to set other conditions, for example that prescribed objects are immediately adjacent, and/or the like. For the determination results from the above-described clash determiner 103, it is possible to also use a determination of position conditions referencing position relationships other than interference of objects.

In addition, a corrector 106 shown in the drawing is an element that can be omitted, and the following preferred embodiment explains the functions thereof.

First, the moving-image processing device 101 displays on the screen a representative frame of the first moving image X and a representative frame of the second moving image Y (step S181). For example, as shown in FIG. 5A, a window 411 of the first moving image X, a window 412 of the second moving image Y, and a cursor 413 are displayed in a screen 401.

In this drawing, the first moving image X is a moving image with a background and the edge of the window 411 is depicted by a solid line. On the other hand, the second moving image Y is a moving image with no background. The periphery of the window 412 is depicted with a transparent color and the edge thereof is depicted by a dotted line. The edge of the window 412 does not necessarily need to be displayed on the screen 401. In this case, the user sees a display on the screen 401 as though the background-less object alone is depicted in the second moving image Y.

Next, the moving-image processing device 101 receives a click action (start of drag) in the window 412 of the second moving image Y from the user (step S182). Here, as shown in FIG. 5B, the user has used the mouse to cause the cursor 413 to move and clicked on a position [s,t] within the second moving image Y.

Furthermore, the moving-image processing device moves the display position of the window 412 of the second moving image Y in accordance with this (step S184) while dragging by the user continues (step S183: Yes). For example, when the user causes the cursor 413 to move while maintaining the click, as shown in FIG. 5C, the window 412 as a whole is caused to move such that the cursor 413 indicates the position [s,t] within the second moving image Y.

When the user has caused the cursor 413 to move as far as a position [u,v] within the first moving image X, as shown in FIG. 5D, and stops the click, the window 412 is dropped into the window 411.

Whereupon, the position [u,v] within the first moving image X and the position [s,t] within the second moving image Y overlap. Accordingly, it can be thought that the user has superimposed the second moving image Y on the first moving image X by accomplishing a transformation causing the second moving image Y to move by u−s in the horizontal direction and by v−t in the vertical direction.

In this way, when dragging by the user ends (step S183: No), the shift amount setter 104 of the moving-image processing device 101 sets the horizontal direction u−s and the vertical direction v−t as the shift amount (step S185). That is to say, the moving-image processing device 101 interprets the change as the user having superimposed the moving image move(u−s, v−t, Y) obtained by moving the second moving image up, down, left or right in parallel with the frame, onto the first moving image X.

Hence, the moving-image processing device 101, using the clash determiner 103, determines whether the object depicted in the first moving image X and the object depicted in the intermediate moving image move(u−s, v−t, Y) made by shifting the second moving image Y clash at any frame time or any position in the frame, or whether no clash occurs (step S186).

When the result of the drop operation shown in FIG. 5C is that no clash occurs (step S186: No), the moving image generator 105 of the moving-image processing device 101 outputs the third moving image superimpose(move(u−s, v−t, Y), X) through composition, and the process concludes.

Through this kind of composition, it is possible for the user to obtain a third moving image in which objects depicted in the moving image Y are positioned so as to not clash with objects in the moving image X. In the third moving image, because no clashes occur with objects depicted in the moving image Y, it is possible to prevent unnatural depictions such as objects eating into each other.

On the other hand, when a clash occurs even when the drop operation shown in FIG. 5C is done (step S186: Yes), the moving-image processing device 101 produces a warning such as audio, vibration, a screen display and/or the like (step S188), the process concludes and a new moving image is not output. That is to say, if the user's commands are appropriate, the third moving image is generated, but if the commands are inappropriate, only a warning is generated and the third moving image is not generated.

The various transformations described above are accomplished in frame units. Accordingly, when a transformation is undertaken on a given moving image to obtain a different moving image, after accomplished transformation processes such as move and/or the like on each frame, it would be fine to execute a different calculation process such as a clash determination and/or the like, and it would be fine to utilize a demand-driven extension evaluation for accomplishing the transformation processes.

If transformation processes are accomplished as demand driven, including the examples hereafter, it is necessary to accomplish an overlap determination and/or the like for a given frame, and initially the transformation is accomplished for that frame. Accordingly, in order to obtain a conclusion that no clashes occur, a transformation for all frames is necessary, but when a clash is identified in a frame within the moving image, the transformation process is not executed for subsequent frames.

In addition, with the method of specifying the shift amount through drag-and-drop, the shift amount is expressed by how much relative to the position of the window 411 of the first moving image X the position of the dropped window 412 of the second moving image Y has been shifted. However, because the shift amount is an amount applied to the second moving image Y, when inputting the shift amount, a comparison to the first moving image X is not required. Accordingly, it would be fine for the user to use the keyboard and directly input a numerical value, or to use a method of inputting the shift amount visually using a mouse and/or the like.

Below, a method for accomplishing automatic adjustment in place of simply emitting a warning when the user's instructions are inappropriate is described.

Third Preferred Embodiment

With this preferred embodiment, when an object of the first moving image X and an object of the second moving image Y clash because of the translation amount of the second moving image Y specified by the user, that clash is avoided and automatic adjustment is accomplished so that the object of the second moving image Y is positioned so as to touch the floor or ceiling of the first moving image X.

With this automatic adjustment, a test of whether a clash occurs when translating the second moving image Y up, down, left or right is repeated at least once, and under many conditions repeatedly executed multiple times. This process is accomplished by the corrector 106 of the moving-image processing device 101. FIG. 8 is a flowchart showing the flow of control of the automatic adjustment process according to this preferred embodiment. The explanation below makes reference to this drawing.

The translation amount up, down, left or right in one test is notated as $\Delta p$ in the horizontal direction and $\Delta q$ in the vertical direction. When constants are used for $\Delta p$ and $\Delta q$, the second moving image Y is adjusted while becoming shifted in a preset direction.

To facilitate understanding, similar to FIGS. 5A through 5D, the case will be considered when a user clicks on a position [s,t] within the second moving image Y, drags to a position [u,v] within the first moving image X while maintaining the click and then stops the click and drops.

In this case, the moving-image processing device 101 of the preferred embodiment accomplishes the below process.

First, the shift amount setter 104 of the moving-image processing device 101 respectively sets the initial value of the variable p as u and the initial value of the variable q as v (step S191). Through this, the initial value of the shift amount in the horizontal direction is set as p−s=u−s and the initial value of the shift amount in the vertical direction is set as q−t=v−t, and the shift amount setter 104 functions as an initial value setter.

Next, the clash determiner 103 of the moving-image processing device 101 determines whether or not the position condition "an object clash does not occur between the first moving image X and the intermediate moving image move(p−s, q−t, Y) that is the second moving image Y shifted by a set shift amount" is established (step S192).

If this is established (step S192: Yes), the moving image generator 105 outputs the third moving image superimpose (move(p−s, q−t, Y),X) through composition (step S913), and this process concludes.

On the other hand, if this condition is not established, the corrector 106 increases the value of the variable p by $\Delta p$ and increases the value of the variable q by $\Delta q$ (step S194). Through this, the shift amount is updated slightly.

Furthermore, when an abandonment condition is satisfied, such as when the translation amount (p−s, q−t) of the moving image Y becomes too large, or when the number of repetitions exceeds a prescribed threshold value, and/or the like (step S195: Yes), it is determined that a clash cannot be avoided, and a warning is emitted (step S196) and this process concludes.

On the other hand, when the abandonment condition is not satisfied and repetition continues (step S195: No), control of the moving-image processing device 101 returns to step S192.

In the coordinate systems of numerous moving images, the direction of increasing the coordinate value in the vertical direction corresponds to the downward direction on the screen. In positioning by moving the object depicted in the second moving image Y in the downward direction of the screen, it would be fine to set $(\Delta p, \Delta q) = (0, 1)$.

In addition, as a result of $(\Delta p, \Delta q) = (0, 1)$ being set initially and the above-described automatic adjustment process being executed, when the determination is that a clash is unavoidable, it would be fine to reset $(\Delta p, \Delta q) = (0, -1)$ and to again execute the same automatic adjustment process.

This corresponds to first looking for a translation amount at which a clash can be avoided while moving from top to bottom, and if this cannot be found, to then looking for a translation amount at which a clash can be avoided while moving from bottom to top.

In the above-described explanation, the clash determiner 103 was simply utilized as the interference determiner. This corresponds to imposing the position condition of object clashes not occurring for the position relationship between objects. However, if determination results from the clash determiner 103 are used, it is possible to utilize other conditions as position conditions in the interference determiner.

For example, it is possible to change the position condition to "'no object clashes occur between the first moving image X and the moving image move(p−s, q−t, Y)' and 'an object clash occurs between the first moving image X and the moving image move(p−s, q+1−t, Y)'". By making this change, the object depicted in the second moving image Y is positioned so as to virtually touch the ground when superimposing the object depicted in the second moving image Y on the first moving image X.

In addition, it is also possible to change the position condition to "'no object clashes occur between the first moving image X and the moving image move(p−s, q−t, Y)' and 'an object clash occurs between the first moving image X and the moving image move(p+$\Delta p$−s, q+$\Delta q$−t, y)'".

In this case, when a translation amount in a given direction is found, the setting is made so as to proceed forward to the extent possible and the test is repeated. For example, when moving from top to bottom, the object of the second moving image Y moves as far as touching the floor of the first moving image X, and when moving from bottom to top, the object of the second moving image Y moves as far as touching the ceiling of the first moving image X.

In cases in which the ground is depicted in the first moving image X, an object moving on a horizontal plane is depicted in the second moving image Y and the orientation of the camera in the first moving image X relative to the ground and the orientation of the camera in the second moving image Y relative to the horizontal substantially match and/or the like, if the above-described process is accomplished, when the object depicted in the second moving image Y is superimposed on the first moving image X, the object depicted in the second moving image Y substantially touches the ground or is positioned so as to float separated from the ground.

There are cases in which an object depicted in the first moving image X is standing still, such as the ground, ceiling, wall and/or the like. For example, there are cases when a user has specified an object in a given frame in advance, cases when the past editing history by the user is understood, and cases when each frame of the first moving image X is understood through contrast.

In this case, setting the position conditions as described above means that the synthesized object set the movable range that can be occupied in the three-dimensional space. That is to say, it is possible to accomplish moving image synthesis in which conditions for the movable range of the object in the three-dimensional space are imposed, such as "the object may float in space if there is no clash," "the object touches the floor or the ground," "the object touches the ceiling" and/or the like.

As described above, (Δp,Δq) is a vector expressing the displacement of the drawing position of the object depicted in the second moving image Y, and by setting the orientation thereof, it is possible to appropriately change the movement direction and movement amount.

In the above-described situation, by moving the second moving image Y along a direction set in advance and superimposing the image on the first moving image X, a new moving image is generated such that objects depicted in the first moving image X and the second moving image Y do not clash, and parallel movement in only the up or down direction of the moving image Y is assumed.

However, after the above-described movement has been accomplished, it would be fine to correct the shift amount so as to minimize the difference between the shift amount and the initial value set by the user, while also satisfying position conditions. In this case, the shift amount closest to the user's designation is used.

In addition, as the direction of (Δp,Δq), it is possible to utilize the vector difference between a representative point of the first object and a representative point of the second object. In this case, a translation is done so that the second object moves in a direction approaching the first object or in a direction moving away from the first object.

Further proceeding with these methods, it would be fine to utilize a method that appropriately sets an evaluation function and to avoid clashes of objects by minimizing this function. This can be thought of as minimizing the "clash amount" when objects clash.

When considering the clash amount of the moving image X and the moving image Y as the sum of the areas of clash zones where clashing objects are depicted in the moving image X and the moving image Y, the clash amount can be calculated through:

collision(Y,X)=
$\Sigma_{t,x,y;X(t)[x,y].id\neq 0,Y(t)[x,y].id>0,overlap(X,Y,t,x,y)>0} 1$ In addition, when the estimated amount of the sum of volumes where clashing objects overlap in the three-dimensional space is taken to be the clash amount, it is possible to utilize:

collision(Y,X)=
$\Sigma_{t,x,y;X(t)[x,y].id\neq 0,Y(t)[x,y].id>0,overlap(X,Y,t,x,y)>0}$ overlap(X,Y,t,x,y).

The clash amount calculated in this manner is taken as the evaluation function.

To minimize the clash amount, it would be fine to repeatedly update the value of the variable indicating the degree of shifting of the moving image Y such as p and q and/or the like by setting the update direction (Δp,Δq) of the unset variable through a random walk, steepest descent method or conjugate gradient method, preparing (1,0), (0,10), (−1,0), (0,−1) and/or the like in advance as candidates for (Δp,Δq), finding the change in the clash amount when utilizing these and selecting that for which the clash amount declines most.

For example, when accomplishing translation, it is possible to find the translation amounts p−s and q−t for avoiding clashes between objects if s, t, u and v are set as described above, the initial values of the variables p and q are taken to be u and v, p and q that minimize collision(move(p−s, q−t, Y),X) are found and collision(move(p−s, q−t, Y),X)=0 is established at the final point arrived at.

In addition, besides translations up, down, left and right, it would be fine to arbitrarily combine translation in the depth direction, rotation, scaling and time shifting.

For example, when combining translations up, down, left or right and in the depth direction, s, t, u and v are set as described above, u, v and 0 are taken as initial values of p, q and r, and p, q and r are found that minimize collision (push(r, move(p−s, q−t, Y)),X).

When combining rotations about the horizontal axis and the vertical axis and translations, s, t, u and v are set as described above, u, v, 0 and 0 are taken as the initial values of p, q, θ and φ, and p, q, θ and φ are found that minimize collision(rotver(φ, rothor(θ, move(p−s, q−t, Y))), X).

When extreme translations or rotations occur, conventionally depiction of the rear surface of the object becomes necessary. However, if the moving image Y is a 2.5-dimensional moving image, there is no information about the rear surface of the object. Hence, upper limits and lower limits are set in advance for the translation amounts p−s, q−t and r and the rotation amounts θ, φ, ψ and/or the like, and through this it is possible to prevent movement of an object in the moving image Y from being viewed unnaturally.

In addition, in order to reduce the shift amount to the extent possible, there is also a method of taking as the evaluation function the result of adding the above-described clash amount to a value found by multiplying a prescribed integer constant by the squared value or absolute value of a transformation parameter of the translation amounts p−s, q−t or r or the rotation amounts θ, φ, ψ and/or the like and continuing to update transformation parameter. When the initial value of the transformation parameter is set to a value specified by the user, if the displacement in the transformation parameter is combined with the evaluation function, it is possible to find the shift amount closest to the value specified by the user.

Furthermore, below a situation in which the translation amount in the depth direction is adjusted by command of the user is considered.

First, with the translation amount in the depth direction taken as 0, in the above-described method p and q are selected so that the object touches the floor. As a result, a moving image with the moving image move(p−s, q−t, Y) superimposed on the first moving image X was obtained.

Following this, the user specifies a translation amount r in the depth direction through wheel operation of the mouse and/or the like.

Then, updating of the variable (p,q) is repeated using (Δp,Δq) the same as in the above-described situation until the condition "objects do not clash between the first moving image X and the moving image push(r, move(p−s, q−t, Y))" and 'objects clash between the first moving image X and the moving image push(r, move(p−s, q+14, Y))'" is satisfied.

By utilizing these situations, it is possible to generate a moving image in which the depth movement is only the translation amount specified by the user and the object continues to touch the floor.

When automatically adjusting, it is possible to first utilize a situation in which the third moving image Z is generated by synthesizing the first moving image X and the second moving image Y (or a moving image in which the second moving image Y is shifted in accordance with user commands). In this situation, when synthesis occurs, if each pixel in the third moving image Z is derived from one of the objects and a given object is depicted as hiding a different object, the pixel value in the hidden zone of the hidden object and the depth information are stored separately.

The third moving image Z is corrected while referencing this stored information so that no clashes of objects occur. In making this correction, there are times when the depth direction of the object changes. In this case, it would be fine to reference the pixel information in the original second moving image Y so as to preserve to the extent possible the resolution of the outer appearance of the object because scaling is conducted when the object is depicted within the frame.

These situations, when compared to the above-described methods, simply substitute the order of the calculation process as a situation in which the method of storing information differs, and the action principle thereof can be viewed as substantively the same.

In addition, the clash amount is considered to show the amount of penetration between objects, so it is possible to accomplish synthesis of a moving image by imposing the condition that "a certain degree of penetration between objects is fine."

Even if the above-described various methods are utilized, there are times when a clash of objects is unavoidable. In such cases, schemes such as those explained below are necessary.

Fourth Preferred Embodiment

With the above-described preferred embodiments, when the user specified the translation amount up, down, left or right for an object in the moving image Y and tried to superimpose this on the moving image X, if a clash of objects arose, the explanation was for a situation for producing a warning (second preferred embodiment) and a situation for automatically adjusting the translation amount (third preferred embodiment).

This preferred embodiment can be applied to both of the above-described preferred embodiment, and displays an area where the user can drop an object, that is to say an area comprising a drop position where a moving image in which objects do not clash is generated through a drop operation by the user, in an easy-to-understand way prior to the drop operation by the user.

Figure 9B:
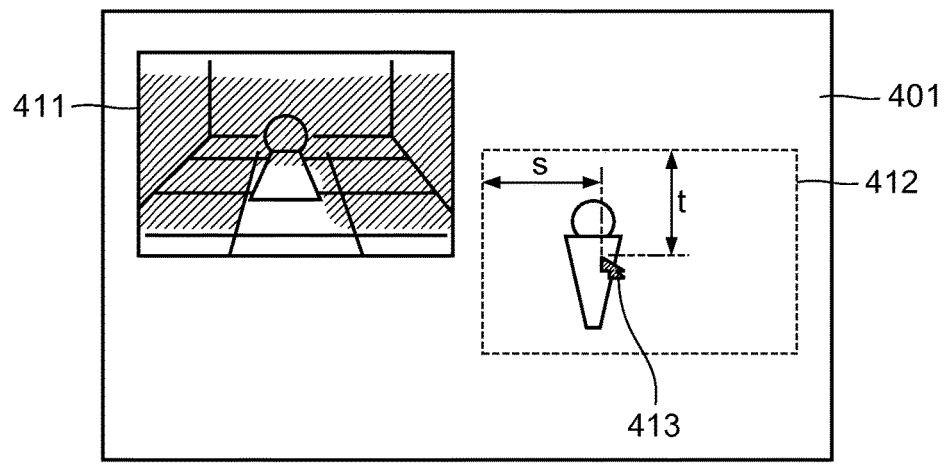
FIG. 9B is an explanatory drawing showing the state of the screen at the point in time when dragging starts.
Figure 9C:
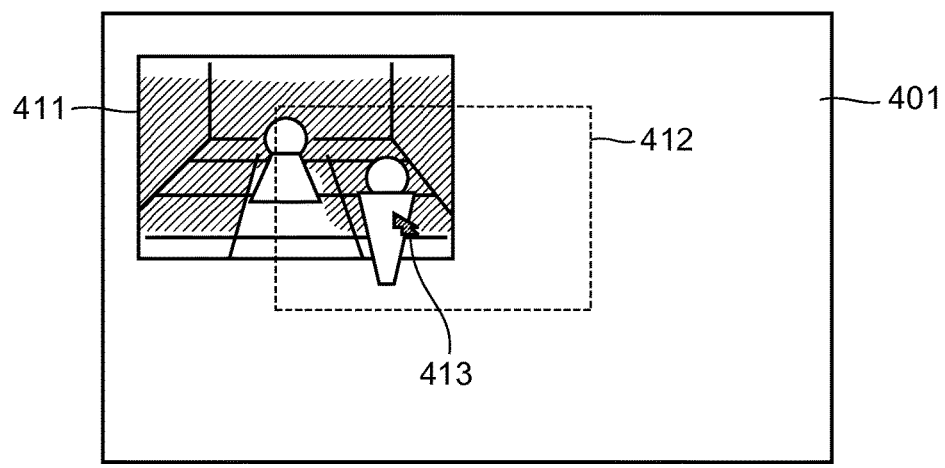
FIG. 9C is an explanatory drawing showing the state of the screen at a point in time during dragging.
Figure 9D:
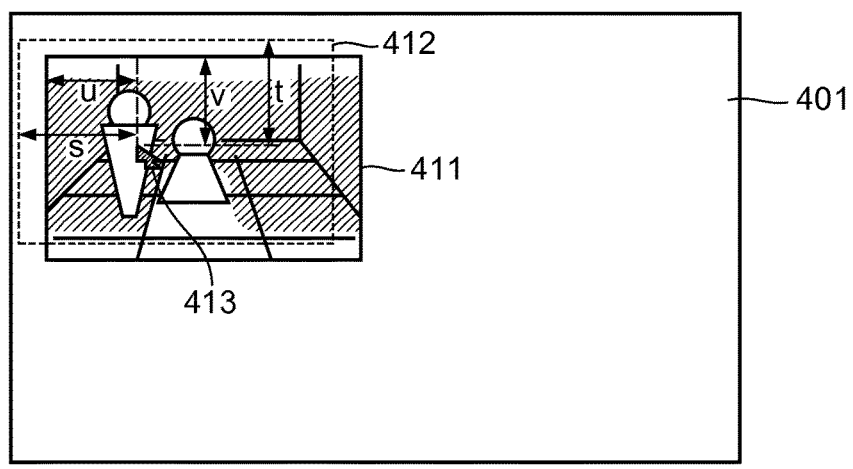
FIG. 9D is an explanatory drawing showing the state of the screen at a point in time when the image has been dropped.

FIG. 9A is an explanatory drawing showing the condition of the screen prior to a drop being started, FIG. 9B is an explanatory drawing showing the condition of the screen at the point in time when a drop is started, FIG. 9C is an explanatory drawing showing the condition of the screen at a point in time during a drop, and FIG. 9D is an explanatory drawing showing the condition of the screen at the point in time that the drop is accomplished. The explanation below makes reference to these drawings.

Figure 10:
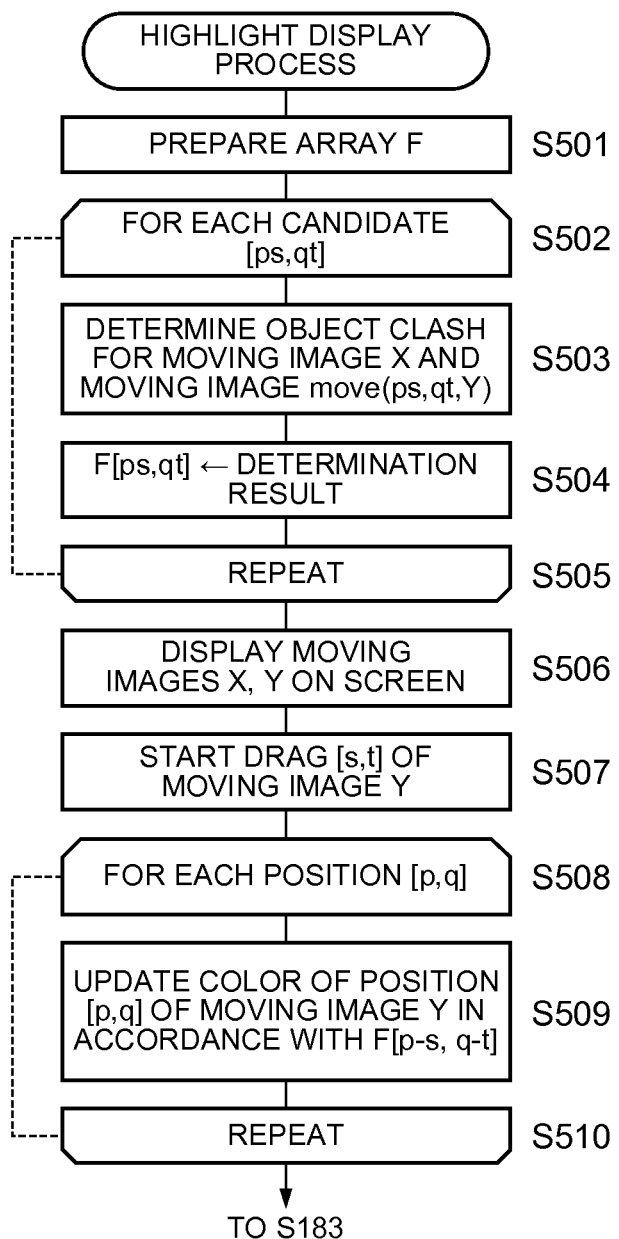
FIG. 10 is a flowchart showing the flow of control of a highlight display process in the droppable region.

FIG. 10 is a flowchart showing the flow of control of a highlighted display process for a droppable area. The explanation below makes reference to this drawing.

First, an arrangement F having as an index candidates for arbitrary shift amounts utilizable when shifting the second moving image Y in the horizontal direction and the vertical direction is prepared in the RAM (step S501). Below, it is assumed that [ps, qt] is prepared as the index, and that ps and qt are negative values. That is to say, ps may be an integer between the value found by negating the sign of the width of the second moving image Y and the sum of the width of the first moving image X and the width of the second moving image Y, and qt may be an integer between the value found by negating the sign of the height of the second moving image Y and the sum of the height of the first moving image X and the height of the second moving image Y.

Furthermore, for candidates [ps, qt] for the utilizable shift amount for the second moving image Y (step S501), a clash determination for an object is accomplished between the first moving image X and the intermediate moving image move (ps, qt, Y) that is the second moving image Y shifted (step S502), and a process of substituting results of the clash determination into the elements F[ps,qt] of the array F (step S503) is repeated (step S504).

Following this, similar to the above-described preferred embodiment, the window 411 of the first moving image X and the window 412 of the second moving image Y are displayed on the screen (step S506) and the beginning of a drag is received (step S507).

Here, the drag is started when the user clicks on a position [s,t] within the second moving image Y using a mouse.

Assuming that the position [s,t] in the second moving image Y is to be dropped at a position [p,q] within the first moving image X, the intermediate moving image found by shifting the second moving image Y becomes move(p−s, q−t, Y).

Accordingly, it would be fine to refer to element F[p−s, q−t] of the array to determine whether or not objects clash between the first moving image X and the intermediate moving image move[p−s, q−t, Y].

The moving-image processing device 101, for each position [p,q] within the first moving image X (step S508), repeats (step S510) a process of causing the color (any of the color saturation, brightness or hue, or a combination of these) of the pixels in each position [p,q] within the first moving image X to change (step S509) in accordance with the value of F[p−s, q−t].

Through this, the user can distinguish between areas where drops are possible and areas where drops are not possible, and one of the areas is displayed highlighted.

Methods for accomplishing a highlighted display include "causing the color of pixels that are to be highlighted to change and causing the color of other pixels to not change" or "not causing the color of pixels to be highlighted to change and causing the color of other pixels to change."

Following this in the above-described preferred embodiments, it would be fine to proceed to step S183.

The explanation below cites an example. Prior to a drag starting, the first moving image X is depicted without change in the window 411, as shown in FIG. 9A.

The instant a drag is started, the moving-image processing device calculates the droppable area. Furthermore, the droppable area within the window 411 is displayed highlighted, as shown in FIG. 9B. In this drawing, highlighting is illustrated by hatching.

If the user drags the cursor 413 to within the droppable area, as shown in FIG. 9C, and then accomplishes a drop process as shown in FIG. 9D, a third moving image in which objects do not clash is obtained.

With the above-described method, it is possible to cause the experience speed of the highlighted display after a click is done to be improved, and it is possible to accomplish high-speed redrawing when a click is redone (not shown).

However, when sufficient calculating speed can be realized, it would be fine, when the user starts a drag operation, to accomplish a clash determination and effect highlighting for an arbitrary position [p,q] within the first moving image X after [s,t] has been established, based on the shift amount [p−s, q−t].

In this manner, with this method when the user starts dragging the second moving image Y, it is easy to understand where in the first moving image X a drop operation can be done to obtain a new moving image.

Automatic adjustment of the translation amount in the third preferred embodiment corresponds to correcting the drop position to within the droppable area when a drop is made outside the droppable area.

In this preferred embodiment, when this preferred embodiment is utilized after determining whether or not drops are possible for all positions within the frame of the first moving image X, when a drop is made outside the droppable area, by simply correcting the drop position to "a point closest to that drop position within the droppable area" or "the center point of the droppable area" and/or the like, it is possible to accomplish automatic adjustment of the translation amount up, down, left or right.

Correcting the drop position to the boundary delineating the droppable area and other than the droppable area means there is an instant at which an object in the first moving image and an object in the second moving image mutually touch.

Accordingly, it is conceivable that in order to make the object touch the floor to the extent possible, it would be fine to correct the drop position to the lower limit of the droppable area.

Figure 9E:
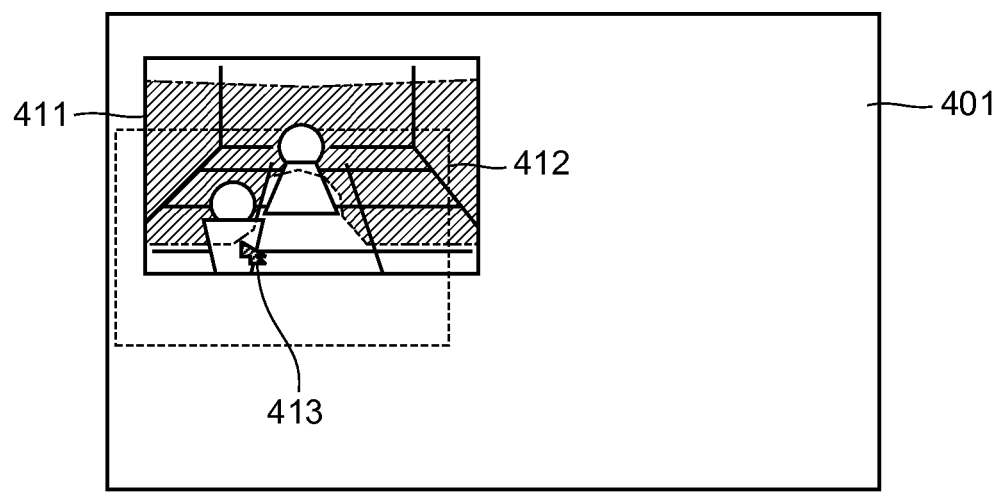
FIG. 9E is an explanatory drawing showing the state in which an automatic correction to the drop position was made after the drop.

FIG. 9E is an explanatory drawing showing the condition when automatic correction of the drop position is accomplished after a drop. As shown in this drawing, the position [s,t] within the window 412 is corrected so as to be superimposed on the lower limit of the droppable area, below the position [u,v] within the window 411.

With this preferred embodiment, it is easy for the user to understand droppable positions, and even when a drop is made at a non-droppable position, the drop position can be easily corrected using information already calculated.

Fifth Preferred Embodiment

The coordinates of a representative point in three-dimensional space for the object i depicted in the moving image X can be notated as (xc(X,t,i), yc(X,t,i), zc(X,t,i)), as described above. This can be viewed as a three-dimensional position vector pos[X,i](t) that changes with time.

In the above-described preferred embodiments, when the object j depicted in the moving image Y is superimposed on the moving image X, when the object j clashes with an object depicted in the moving image X, a moving image W was obtained by translating the moving image Y in the up, down, left or right directions or in the depth direction, or by rotating the moving image Y, or by doing a time shift, and this moving image W was then superimposed on the moving image X.

Because the translation and rotation and/or the like are congruent transformations, when only such transformations are used the position vector pos[Y,j](t) and the position vector pos[W,j](t) that are trajectories of the object j may have differing positions and orientations but the shape is the same. That is to say, a non-deforming transformation that does not deform the trajectory is applied, so the trajectory pos[Y,j](t) and the trajectory pos[W,j](t) are congruent.

Figure 11A:
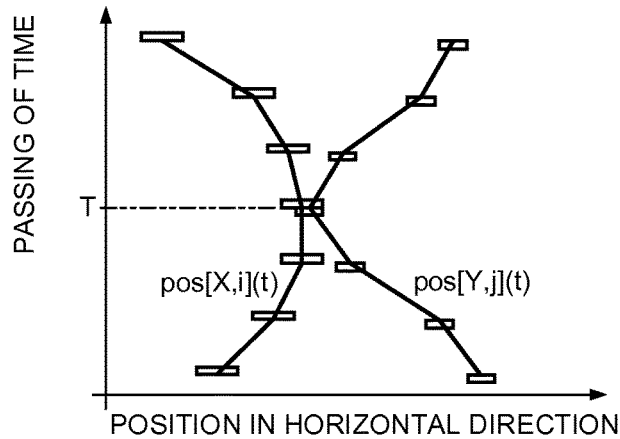
FIG. 11A is an explanatory drawing showing the state of a trajectory pos[X,i](t) and a trajectory pos[Y,j](t)

FIG. 11A is an explanatory drawing showing the condition of the trajectory pos[X,i](t) and the trajectory pos[Y,j](t).

Figure 11B:
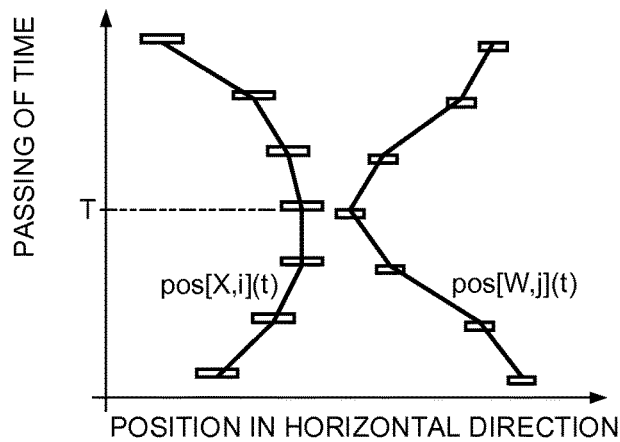
FIG. 11B is an explanatory drawing showing the state of the trajectory pos[W,i](t) and the trajectory pos[W,j](t)

FIG. 11B is an explanatory drawing showing the condition of the trajectory pos[X,i](t) and the trajectory pos[W,j](t).

In these drawings, the position of each trajectory in the horizontal position is shown on the horizontal axis and the passing of time is shown on the vertical axis. In addition, along each trajectory, narrow rectangles are formed indicating the spread of that object in the horizontal direction.

The trajectory pos[W,j](t) in FIG. 11B is the trajectory pos[Y,j](t) in FIG. 11A moved in the horizontal direction, and the shapes of the two are congruent.

If the object i in the moving image X and the object j in the moving image Y clash at time T, as shown in FIG. 11A the trajectory pos[X,i](t) and the trajectory pos[Y,j](t) touch at time T, and the rectangles representing the spread of the objects in the horizontal direction overlap.

On the other hand, no clash occurs between the object i of the moving image X and the object j of the moving image W. Accordingly, as shown in FIG. 11B, the rectangles representing the spread of the objects in the horizontal direction do not overlap.

However, with his kind of congruent transformation, there are cases in which clashes are unavoidable. Hence, with this preferred embodiment, the corrector 106 prevents clashes among objects by applying on the moving image a deforming transformation that deforms the trajectory of the object.

Below, a method is explained in which the trajectory pos[X,i](t) of the object i depicted in the moving image X having a background is not deformed, but the trajectory pos[Y,j](t) of the object j depicted in the moving image Y superimposed on the moving image X is deformed.

First, the position vector pos[Y,j](t) indicating the trajectory is deformed to become the position vector morph(t).

Below, the various coordinate values of the position vector are notated by appending .x, .y and .z.

Through deformation of the trajectory, the depth becomes morph(t).z/pos[Y,j](t).z times. This means that at time t, the object j is enlarged to pos[Y,j](t).z/morph(t).z times within the frame of the moving image Y.

In addition, at time t the object j is moved in the horizontal direction and the vertical direction. The amounts of these movements are respectively (morph(t).x−pos[Y,j](t).x)×pos[Y,j](t).z/morph(t).z, (morph(t).y−pos[Y,j](t).y)×pos[Y,j](t).z/morph(t).z.

Accordingly, when the trajectory is deformed, by combining selection of the object, translation and scaling, it is possible to obtain a moving image in which the trajectory of a given object is deformed.

If deformation of a trajectory is undertaken to avoid a clash between objects, by superimposing the moving image with the trajectory deformed, it is possible to generate one moving image in which objects depicted in multiple moving images are depicted in a state moving without clashing.

Below, various methods of deforming trajectories are described.

In a first method, at a time t at which overlap(X,Y,t,x,y)>0 is established, a process of deforming the trajectory of the object j so that the position pos[Y,j](t) of a representative point of the object j=Y(t)[x,y].id contained in the moving image Y is translated in a direction away from the position pos[X,i](t) of a representative point of the object i=X(t)[x,y].id contained in the moving image X, or in a direction of the primary normal vector to the trajectory pos[Y,j](t), is repeated so that the change in the degree of deformation before and after the time becomes smaller, and so that overlap(X,Y,t,x,y)=0 is established at all times.

FIGS. 12A through 12D are explanatory drawings showing the state in which the trajectory gradually deforms by repeating the process. The explanation below makes reference to these drawings.

Figure 12A:
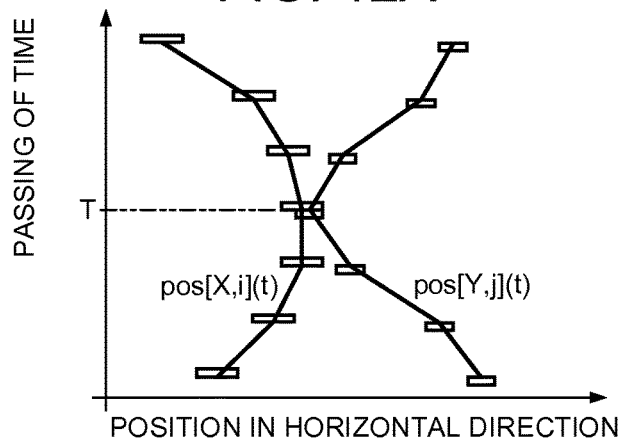
FIG. 12A is an explanatory drawing showing the state of a trajectory gradually deforming through repetition of a process.

In FIG. 12A, similar to FIG. 11A, the trajectory pos[X, i](t) and the trajectory pos[Y,j](t) are touching at time T.

Figure 12B:
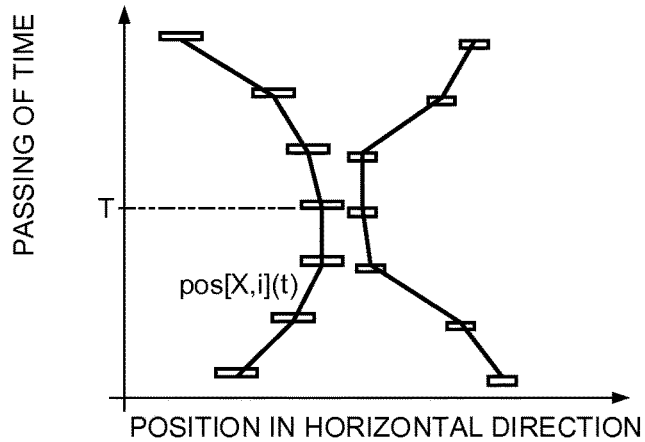
FIG. 12B is an explanatory drawing showing the state of a trajectory gradually deforming through repetition of a process.

In FIG. 12B, the position of the object j at time T is corrected so that no clash occurs.

Figure 12C:
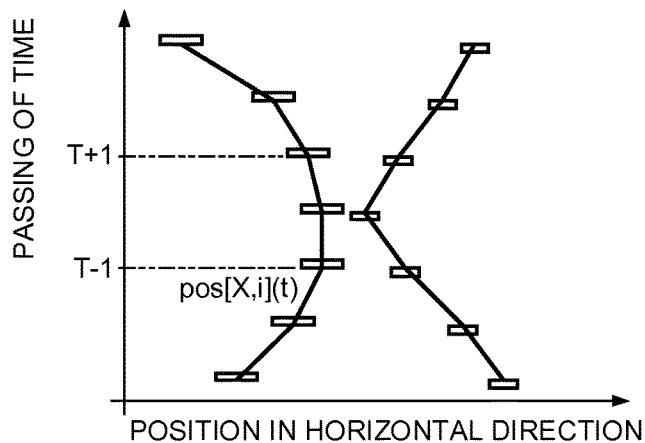
FIG. 12C is an explanatory drawing showing the state of a trajectory gradually deforming through repetition of a process.

Because this correction amount was large, in FIG. 12C the positions of the object j at times T−1 and T+1 before and after the time T are corrected by a smaller amount than the correction amount in FIG. 12B.

Figure 12D:
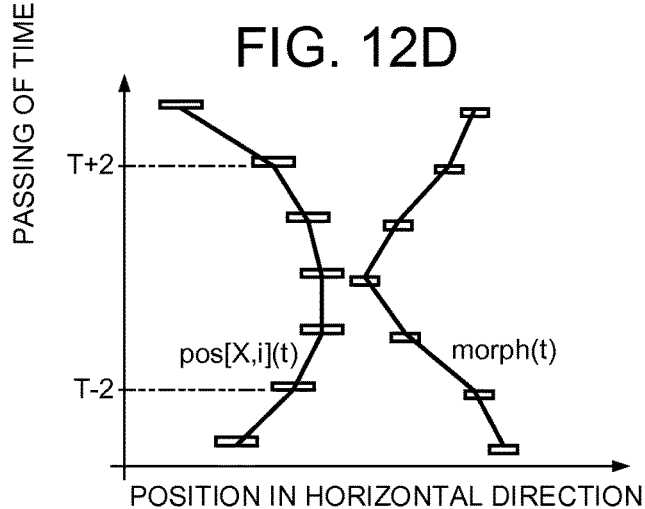
FIG. 12D is an explanatory drawing showing the state of a trajectory gradually deforming through repetition of a process.

Because this correction amount was still large, in FIG. 12D the positions of the object j at the times T−2 and T+2 before and after the previous correction are further corrected by a smaller amount than the correction amount in FIG. 12C.

With this, the correction is sufficient and the trajectory shown in FIG. 12D corresponds to the trajectory morph(t) ultimately obtained.

The correction amount propagated to adjacent frames is reduced by raising the correction amount for the frame itself to a constant power not less than 0 but less than 1, and if the correction amount is smaller than a prescribed threshold value, it would be fine to stop propagation.

When deforming the trajectory, it would be fine to not propagate the corrections before and after the time as described above but to accomplish smooth correction by utilizing spline interpolation.

In addition, with this method, if a clash still occurs after accomplishing the above-described kind of correction and propagation of correction amount at the point in time when the clash amount is greatest, it is possible to make the correction amount and correction frequency as small as possible by repeating the same process.

A second method is a method that, when deforming the trajectory pos[Y,j](t) at time t, causes only the size of the primary normal vector (a vector orthogonal to the speed vector and corresponding to a direction that bends the orientation of the speed vector) without changing the size of the tangent vector to the trajectory (corresponding to the speed vector) and minimizes to 0 collision(Y,X) while also minimizing the sum of changes in the size of the primary normal vector (typically the sum of squares).

Figure 13:
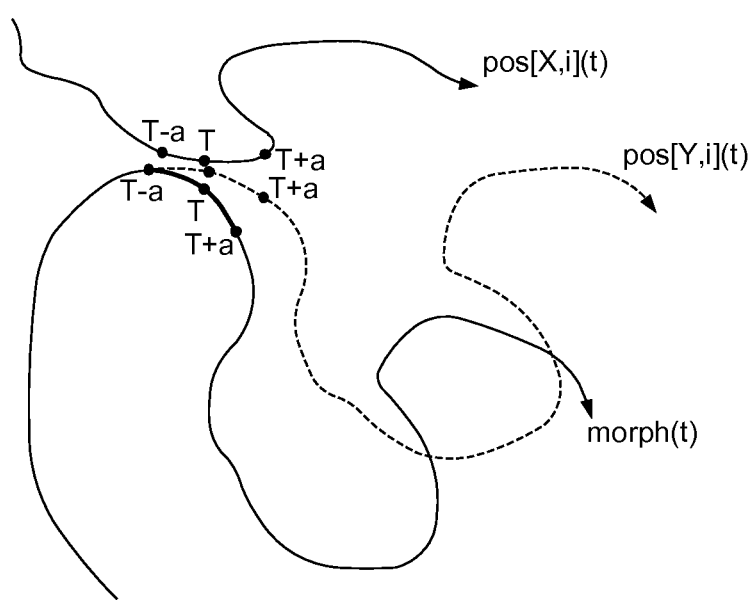
FIG. 13 is an explanatory drawing showing the state of adjusting a primary normal vector in a specific part of a trajectory in order to avoid a clash.

FIG. 13 is an explanatory drawing showing the state in which the primary normal vector is adjusted in specific parts of the trajectory. This drawing shows the shapes of the trajectory without change.

In this drawing, the trajectory pos[X,i](t) clashes with the trajectory pos[Y,j](t) at time T. Hence, at the adjusted zone T-a to T+a before and after the time T, the curve of the trajectory pos[Y,j](t) is adjusted so that a clash does not occur, and a post-correction trajectory morph(t) is obtained.

The shapes of the trajectory pos[Y,j](t) and the trajectory morph(t) after the time T+a are congruent.

In the first method, calculation is simple but the divergence between the trajectory and movement of the object j expressed by the moving image becomes large, and at this time, there are times when it appears as though the object j is suddenly doing a "moonwalk."

Whether or not the object j makes unnatural movements can be determined by whether or not the size and orientation of the tangent vector to the trajectory of the object j, the size of the primary normal vector (this is a value corresponding to the curvature of the trajectory) and the change in the orientation exceed prescribed threshold values.

When it is determined that the movement of the object is unnatural due to deformation of the trajectory, if a warning to that effect is output, the convenience of the user is high.

In repeating the deformation process of the trajectory, it would be fine to set in advance an upper limit to the deformation amount of the trajectory. In this case, movement of the object does not become unnatural, but there is a possibility that it might not be possible to avoid clashes.

With the second method, the calculations are more complex but the movement direction of the object j changes only slightly and the size of the movement speed does not change, so no "moonwalk" occurs.

When a background is depicted in the moving image X along with the object i, when the trajectory of the object i is caused to change, there are cases in which gaps with no pixel information occur between the background and the object i. Hence, with this preferred embodiment, only the trajectory of the object j depicted in the moving image Y is deformed.

However, when background is not contained within the moving image X, when object i and object j clash, it would be fine to deform both trajectories. With the first method, it would be fine to cause the object i and the object j to move in directions becoming mutually farther apart, and with the second method, it would be fine to minimize both the amount of change in the primary normal vector of the trajectory of the object i and the amount of change in the primary normal vector of the trajectory of the object j.

In these methods, it is possible to prevent unnatural movement of the object and to increase user convenience by setting an upper limit on the amount of change in the primary normal vector or to produce a warning when the amount of change in the primary normal vector exceeds a prescribed threshold value.

In this configuration, even when a clash is unavoidable with a simple translation, rotation, scaling and/or the like of the objects depicted in the moving images, it is possible to prevent a clash by deforming the trajectory.

In this preferred embodiment and the above-described preferred embodiments, methods for avoiding clashes of objects are disclosed. However, it is also possible to impose the limiting condition that contact between the surfaces of the objects occurs at a desired point in time.

That is to say, by imposing the restriction that at the desired point in time there is overlap in the occupancy zone from the anterior-surface depth to the rear-surface depth of the two objects at a position where the two objects are depicted overlapping, and overlap is 0, movement of the object and deformation of trajectories is accomplished so that the restriction is satisfied.

In addition, it would be fine to cause deformation of both trajectories of the objects i and j depicted in both moving images X and Y. In this case, it would be fine to accomplish deformation so as to minimize the clash amount by compiling and treating the deformation parameters for the object i and the deformation parameters for the object j.

Sixth Preferred Embodiment

When the object j depicted in the moving image Y is an object that dances on a flat surface and a floor is included in the background in the moving image X, it is desirable for the object j to be superimposed so as to dance on the floor of the moving image X. This preferred embodiment realizes this.

With the above-described preferred embodiment, the explanation was for the condition in which the inclination of a camera with respect to the ground in the moving image X and the inclination of the camera with respect to a plane in the moving image Y match, but in this preferred embodiment this kind of matching is not necessarily required.

First, as a representative point of the object j depicted in the moving image Y, a point depicted the farthest downward on the screen is selected. When the object j is a character that dances, the representative point selected in this manner corresponds to the feet of the character.

The pixel position [xb(Y,t,j), yb(Y,t,j)] of the representative point can be calculated for example as follows:

$$yb(Y,t,j) = \min_{x,y; Y(t)[x,y].id=j} y$$

$$xb(Y,t,j) = \min_{x,y; Y(t)[x,y.b(Y,t,j)].id=j} x.$$

Here, if the lowest point of the object j makes contact with the floor of the moving image X, then:

$$X(t)[xb(Y,t,j),xb(Y,t,j)].id=0;$$

$$Y(t)[xb(Y,t,j),xb(Y,t,j)].id=j;$$

$$X(t)[xb(Y,t,j),xb(Y,t,j)].fore=Y(t)[xb(Y,t,j),xb(Y,t,j)].fore$$

should be established.

Accordingly, if the translation amount in the up, down, left and right directions and also the depth direction of the moving image Y and the amount of rotation about the various axes is determined so that in addition to minimizing collision(Y,X) to 0, the sum of the differences (typically, sum of squares) of X(t)[xb(Y,t,j), xb(Y,t,j)].fore and Y(t)[xb(Y,t,j), xb(Y,t,j)].fore is also minimized, the object j depicted in the moving image Y touches the floor surface depicted in the moving image X.

When the object j jumps from the floor in the middle of a dance, it is impossible for X(t)[xb(Y,t,j), xb(Y,t,j)].fore and Y(t)[xb(Y,t,j), xb(Y,t,j)].fore to perfectly match, but by accomplishing minimization, it is possible to prevent the condition of separating from the floor at instants when not jumping.

In addition, through minimization, it is possible to make the behavior of the object j superimposed on the moving image X natural to the extent possible by making the floor the object j is on in the moving image Y and the floor in the moving image X match to the extent possible.

Seventh Preferred Embodiment

With the above-described preferred embodiment, in the various transformations of the 2.5-dimensional moving image, an independent calculation process was accomplished for each position and each piece of depth information within a single object, and computations were made to reflect this to the extent possible. In this preferred embodiment, the computation burden is further reduced by accomplishing approximations using representative points of objects.

That is to say, in this preferred embodiment, the coordinates (xc(X,t,i), yc(X,t,i)) in the moving image X of the representative point of the object i at time t in the moving image X and the depth coordinate zc(X,t,i) of the representative point are calculated.

The object i moves as a group in its entirety, so the depth coordinates of the various parts of the object i can be approximated by zc(X,t,i). Accordingly, when the depth of the representative point changes from zc(X,t,i) to zc(X,t,i)+r, the depth at each position is approximated as [zc(X,t,i)+r/zc(X,t,i)] times. This kind of approximation is effective for translations in the depth direction, and rotations about the horizontal axis or the vertical axis, of the moving image.

Specifically, the movement destination of only the representative point of the object i that is the target of translation or rotation about the horizontal axis or the vertical axis is found through the same calculations as in the above-described preferred embodiments. Furthermore, by scaling and positioning the moving image in accordance with changes in the depth of the representative point centered on this movement destination, the above-described computation is simplified.

With the transformation in this preferred embodiment, the shape of the object i is assumed to be an object in which a picture is depicted on the surface of a sheet perpendicular to the depth direction, and even when a translation in the depth direction or rotation about the horizontal axis or the vertical axis is done, this corresponds to moving the sheet perpendicularly to the depth direction.

With a translation in the depth direction, the sheet remains perpendicular to the depth direction. In this preferred embodiment, by setting an upper limit to the angle of rotation about the horizontal axis or the vertical axis, the position of the sheet is caused to change through rotation with an angle or rotation up to a number of degrees, but the orientation of the sheet is thought of as remaining perpendicular to the depth direction.

Below, the specific transformation computation is described.

The moving image obtained by moving the object i depicted in the moving image X by r in the depth direction is obtained by accomplishing the following processes.

(a) Only the object i is selected from the moving image X, (b) a translation is done along the frame with (xc(X,t,i), yc(X,t,i)) as the origin, (c) the moving image is scaled to zc(X,t,i)/[zc(X,t,i)+r] times, and (d) a translation is done along the frame so that the origin becomes (xc(X,t,i), yc(X,t,i)).

Accordingly, when the transformation of moving the object i depicted in the moving image X by r in the depth direction is notated as push'(i,r,X), the result is:

$$push'(i,r,X) = move(xc(X,t,i),yc(X,t,i),scale(zc(X,t,i)/[zc(X,t,i)+r],move(-xc(X,t,i),-yc(X,t,i),select(i,X)))).$$

In addition, when the object i depicted in the moving image X is rotated by θ about the horizontal axis, the coordinates in the moving image of the representative point of the object move from (xc(X,t,i), yc(X,t,i)) to (xc(X,t,i), zc(X,t,i)×cos θ−yc(X,t,i)×sin θ), and the depth moves from zc(X,t,i) to zc(X,t,i)×sin θ+yc(X,t,i)×cos θ. That is to say, it would be fine to accomplish the below processes.

(a) Select only the object i from the moving image X, (b) move (xc(X,t,i), yc(X,t,i)) to (xc(X,t,i), xc(X,t,i)×cos θ−yc(X,t,i)×sin θ) along the frame, and (c) scale the moving image to zc(X,t,i)/[zc(X,t,i)×sin θ+yc(X,t,i)×cos θ] times.

Accordingly, when the transformation of rotating the object i depicted in the moving image X by θ about the horizontal axis is notated as rothor'(i, θ, X), then:

$$rothor'(i,\theta,X) = scale(zc(X,t,i)/[zc(X,t,i)\times\sin\theta+yc(X,t,i)\times\cos\theta],move(0,zc(X,t,i)\times\cos\theta-yc(X,t,i)\times\sin\theta-yc(X,t,i),select(i,X))).$$

A transformation rotver'(i, θ, X) for rotating the object i depicted in the moving image X by φ about the vertical axis is similarly defined. That is to say, $$rothor'(i,\phi,X) = scale(zc(X,t,i)/[zc(X,t,i)\times\sin\theta+xc(X,t,i)\times\cos\theta],move(zc(X,t,i)\times\cos\theta-xc(X,t,i)\times\sin\theta-xc(X,t,i),0\ select(i,X))).$$

With this preferred embodiment, a transformation of a single object depicted in the moving image is expressed through a combination of the computations move, select and scale having a light calculation burden, so it is possible to speed processing.

Eighth Preferred Embodiment

With the above-described preferred embodiment, the time of the moving image X underwent the shift transformation shift(d,X) by d, but it is possible to conceive of a transformation in which the moving image X is slowly replayed or fast-forwarded.

If the moving image Y is the moving image X fast-forwarded by a times, then:

$$Y(t)[x,y]=X(t/a)[x,y]$$

is established. Below, this transformation is notated as fastforward(a,X).

Because the object i depicted in the moving image X and the object j depicted in the moving image Y both repeat a given action, when the desire is to synthesize a moving image Z such that the object i and the object j alternately appear at a designated location within the moving image, it is possible to use a combination of shift and fastforward.

For example, consider the case in which the desire is to synthesize the moving image X, in which a person (object i) who is doing the action of pounding rice cake in a mortar with a wooden pestle, and the moving image Y, in which a person (object j) is doing the action of kneading by hand rice cake in the same mortar, and to generate a moving image expressing the state of the person A and the person B jointly making rice.

When the appearance in and surrounding the mortar, and the position and orientation of the camera that did the shooting, are common in the moving image X and the moving image Y, it would be fine to find parameters for shift and fastforward so as to minimize the evaluation function expressing the clash amount.

In addition, when the desire is to determine from the moving image whether or not it is possible to position furniture and electronic products inside a house, it is possible to apply this kind of transformation.

For example, when the desire is to determine from the moving image whether or not it is possible to position a washing machine whose door opens and closes inside a homes washroom, it would be fine to accomplish the following kind of process.

That is to say, an electrical product maker or an electric product vendor provides on the Web a moving image X in which the situation of the door of the washing machine opening and closing periodically is shot from the front.

On the other hand, a user considering the purchase of the washing machine prepares a moving image Y in which the situation of a door to the room in which the washing machine would be installed opening and closing is shot from the front.

After accomplishing normalization so that the distance from the camera to the washing machine in the moving image X and the distance from the camera to the candidate location for washing machine installation in the moving image Y substantially match, the user drags and drops the object of the washing machine in the moving image X to the installation candidate location in the moving image Y.

Furthermore, the clash amount of the objects in the moving images X and Y is found. If there is no clash, it is possible to estimate that the washing machine can be installed in the desired location. In addition, even when there is a clash, if it is possible to find parameters for shift and fastforward so as to minimize the clash amount and make it so no clash occurs, naturally is it possible to estimate that the washing machine can be installed in the desired location.

When the user shoots the inside of the room, the shooting direction is sometimes limited. In such a case, it would be fine to provide moving images in which the washing machine whose door periodically opens and closes is shot from a variety of directions, such as situations in which shooting is from the front and also situations in which shooting is from the left side and situations in which shooting is from the right side, and for the user to be allowed to select the moving image shot from the same direction as the direction in which the user shot the room.

Ninth Preferred Embodiment

In the above-described preferred embodiments, it is possible to synthesize a moving image so that clashes in which objects mutually penetrate each other do not occur, and it is also possible to synthesize moving images such that the surfaces of objects touch at a desired instant or the bottom of an object touches the floor. Below, specific applications of the above-described preferred embodiments are described.

The first application example is to enable exhibitors to easily prepare moving images showing the situation of products in electronic markets such as Internet auctions and/or the like.

That is to say, the operator of an electronic market provides moving image materials so that users can freely use such, in addition to providing editing tools for various types of moving images. This moving image material may be prepared by exhibitors or bidders in the electronic market, or a moving image distribution system may be separately prepared so that publicly usable moving images are uploaded and can be perused by other users, and moving images accumulated in this moving image distribution system may be reused.

It would be fine for exhibitors to shoot in advance moving images expressing backgrounds such as in rooms of a exhibitor's house and/or the like, and when doing so to prepare a decorated table or folding screen and/or the like so that the product can be charmingly presented, and it would also be fine for the products in the room to be kept tidy and in order, and cleaned, so no private information can be understood. In addition, the background moving image may be selected from the moving image material.

Following this, when the exhibitor wants to exhibit a new product, it is possible to accomplish shooting at a preferred location inside the room without having to tidy and organize products or do cleaning.

Following this, the exhibitor drags and drops the moving image of the new product that was shot onto the background moving image shot in advance. Whereupon, it is possible to synthesize a moving image showing a situation in which the product does not clash with products (the folding screen and/or the like) of the background image and touches the floor (the surface of the decorated table and/or the like) of the background image, through the above-described clash avoidance and automatic adjustment of position.

The composition of the product moving image on the background moving image may be done by bidders as well as exhibitors. For example, if a party dress is being exhibited, a product moving image could be provided showing a situation in which the exhibitor's model and/or the like is wearing that dress, walking and turning around.

The bidder could shoot on their own a background moving image shooting the inside of an assembly hall where a party they want to attend wearing the dress is being hosted, or could select from among the moving image materials. Furthermore, the bidder synthesizes a product moving image of the dress worn by the model, on the background moving image of the party hall.

By applying the above-described preferred embodiment, the model moves on top of the floor, but the moving image is synthesized so that there are no clashes with other people, furniture or facilities inside the hall.

By perusing this moving image, the bidder can check in advance whether or not the dress being exhibited as a product matches the atmosphere of the party hall, prior to bidding.

A second application example further utilizes the moving image materials.

For example, if a background moving image showing a situation in which a famous performer is dancing to music is provided as moving image material, a user could synthesize a moving image showing a situation in which the user is dancing along with the famous singer, by shooting and composing a moving image of the user dancing.

In addition, when a background moving image showing a situation in which a merry-go-round is moving with empty seats is provided as moving image material, it is possible to synthesize a moving image showing a situation with the user riding the merry-go-round, by shooting a moving image of the user riding a bicycle, a wagon and/or the like or other vehicle moving along substantially the same trajectory as the merry-go-round and accomplishing composition of the moving image while imposing the restrictive condition that "the user is continuously touching the merry-go-round".

In addition, when a user synthesizes a moving image of swinging his arm or a racket forcefully downward with a background moving image in which a ball fiercely strikes the floor, if the restrictive condition that the user's hand or racket and the ball make contact at the instant when the user swings his arm downward is imposed, it is possible to generate a moving image showing the user spiking a volleyball or smashing a tennis ball.

Furthermore, multiple moving image materials can be synthesized shooting a single person practicing fencing or kendo, and if the condition that objects contact with timing at the instant the player who was shot performs a deciding move is imposed, a moving image can be synthesized that appears as though a match is underway.

This application claims the benefit of Japanese Patent Application No. 2012-161924, filed on 20 Jul. 2012, the entire disclosure of which are incorporated by reference herein, to the extent permitted by the laws of the designated country.

INDUSTRIAL APPLICABILITY

With the present disclosure, it is possible to provide a moving-image processing device, moving-image processing method, and non-transitory information recording medium for ensuring that objects do not satisfy interference conditions when objects accompanied by depth information and depicted in multiple moving images are compiled into one moving image.

REFERENCE SIGNS LIST

11 Shooting point
12 Projection surface
13 Half line
14 Object
15 Clash point
17 Z distance
21 Representative point
101 Moving-image processing device
102 Rear-surface depth acquirer
103 Clash determiner
104 Shift amount setter
105 Moving image generator
106 Corrector
401 Screen
411 Window
412 Window
413 Cursor

The invention claimed is:

1. A moving-image processing device for synthesizing a first moving image and a second moving image, wherein a first object is depicted in the first moving image and is accompanied by depth information of the first object, a second object is depicted in the second moving image as moving along a second object trajectory and is accompanied by depth information of the second object, the depth information of the first object comprises anterior-surface depth information of the first object and rear-surface depth of the first object, and the depth information of the second object comprises anterior-surface depth information of the second object and rear-surface depth of the second object, the moving-image processing device comprising:

at least one non-transitory memory operable to store program code;

at least one processor operable to read said program code and operate as instructed by said program code, said program code including:

moving image generating code configured to cause said at least one processor to generate a third moving image synthesizing the first moving image and the second moving image;

interference determining code configured to cause said at least one processor to determine whether or not the first object and the second object satisfy an interference condition in the third moving image, by referencing the second object trajectory, the anterior-surface depth information of the first object, the rear-surface depth of the first object, the anterior-surface depth information of the second object and the rear-surface depth of the second object; and correcting code configured to cause said at least one processor to correct the second moving image by applying a non-deforming transformation that maintains a shape of the second object trajectory, when it is determined that the interference condition is satisfied, wherein the second object moves within the second moving image over time.

2. The moving-image processing device according to claim 1, wherein:

the non-deforming transformation is a time shift, translation, rotation, scaling or a combination of these, with the time length of the time shift, translation amount, rotation amount, or scaling ratio in the space, or a combination of these, as a transformation parameter; and said program code further includes initial value setting code configured to set an initial value of the transformation parameter; and the correcting code causes said at least one processor to apply the non-deforming transformation by the transformation parameter, and updates the transformation parameter so that the interference condition is not satisfied.

3. The moving-image processing device according to claim 2, wherein the correcting code causes said at least one processor to repeat updating of the transformation parameter until a first time it is determined that the first object and the second object do not clash.

4. The moving-image processing device according to claim 3, wherein the correcting code causes said at least one processor to update the transformation parameter within a prescribed correction range so that an elapsed time until the interference condition is for the first time satisfied increases.

5. The moving-image processing device according to claim 3, wherein:
the interference determining code causes said at least one processor to calculate a clash amount indicating a degree of clash between the second object and the first object; and
the correcting code causes said at least one processor to update the transformation parameter within a prescribed range so that the clash amount declines.

6. The moving-image processing device according to claim 5, wherein the clash amount is a sum of volumes in which a shape of the first object estimated based on the depth information of the first object in each frame and a shape of the first object estimated based on the depth information of the transformed object determined based on the depth information of the second object overlap.

7. The moving-image processing device according to claim 5, wherein the clash amount is a sum of areas in which an area in which the first object should be depicted in each frame and an area in which the transformed object should be depicted overlap.

8. The moving-image processing device according to claim 2, wherein the correcting code causes said at least one processor to repeat updating of the transformation parameter until the first time it is determined that the first object and the second object do not clash and it is determined that if the next update is done, the first object and the second object will clash.

9. The moving-image processing device according to claim 1, wherein the interference condition is satisfied if the first object and the second object clash.

10. The moving-image processing device according to claim 1, wherein the moving image generating code causes said at least one processor to obtain a three-dimensional position where a representative point of the second object is positioned, from a position within a frame where a representative point is depicted in the frame and a depth position of a representative point determined from depth information of the second object, and to obtain a transformed position by applying a congruent transformation of three-dimensional space on the three-dimensional position, and obtains a drawing position where the transformed position should be drawn within the frame, and obtains the transformed moving image by implementing a translation transformation based on a difference between the position within the frame and the drawing position obtained, and applying a scaling transformation based on a ratio of the depth position and the depth of the transformed position.

11. The moving-image processing device according to claim 1, wherein the moving image generating code is configured to cause said at least one processor to generate the third moving image by superimposing objects other than a background of the second moving image onto the first moving image.

12. The moving-image processing device according to claim 1, wherein a first moving image dimension of the first moving image corresponds to a second moving image dimension of the second moving image.

13. The moving-image processing device according to claim 1, wherein the depth information of the first object comprises a first depth map and the depth information of the second object comprises a second depth map.

14. The moving-image processing device according to claim 1, wherein the shape of the trajectory expressing movement within the space is maintained before and after the interference condition is satisfied.

15. The moving-image processing device according to claim 1, wherein the first object moves within the first moving image over time.

16. The moving-image processing device according to claim 1, wherein the first object is depicted in the first moving image as moving along a first object trajectory, and
the interference determining code is further configured to cause said at least one processor to determine whether or not the first object and the second object satisfy the interference condition in the third moving image, by referencing the first object trajectory, the second object trajectory, the depth information of the first object and the depth information of the second object.

17. The moving-image processing device according to claim 1, wherein the second object trajectory indicates movement of the second object within the second moving image, and
the non-deforming transformation modifies the trajectory of the second object within the second moving image and maintains the shape of the second object trajectory.

18. The moving-image processing device according to claim 1, wherein the interference determining code is further configured to cause said at least one processor to compare the anterior-surface depth information of the first object with the rear-surface depth of the second object, and compare the anterior-surface depth information of the second object with the rear-surface depth of the first object.

19. A moving-image processing method, executed by a moving-image processing device including at least one processor, for synthesizing a first moving image and a second moving image, wherein a first object is depicted in the first moving image and is accompanied by depth information of the first object, a second object is depicted in the second moving image as moving along a second object trajectory and is accompanied by depth information of the second object, the depth information of the first object comprises anterior-surface depth information of the first object and rear-surface depth of the first object, and the depth information of the second object comprises anterior-surface depth information of the second object and rear-surface depth of the second object, the moving-image processing method comprising:
generating, using said at least one processor, a third moving image synthesizing the first moving image and the second moving image;
determining, using said at least one processor, whether or not the first object and the second object satisfy an interference condition in the third moving image, by referencing the second object trajectory, the anterior-surface depth information of the first object, the rear-surface depth of the first object, the anterior-surface depth information of the second object and the rear-surface depth of the second object; and correcting, using said at least one processor, the second moving image by applying a non-deforming transformation that maintains a shape of the second object trajectory, when it is determined that the interference condition is satisfied, wherein the second object moves within the second moving image over time.

20. A non-transitory computer-readable medium on which is recorded a program for synthesizing a first moving image and a second moving image, wherein a first object is depicted in the first moving image and is accompanied by depth information of the first object, a second object is depicted in the second moving image as moving along a second object trajectory and is accompanied by depth information of the second object, the depth information of the first object comprises anterior-surface depth information of the first object and rear-surface depth of the first object, and the depth information of the second object comprises anterior-surface depth information of the second object and rear-surface depth of the second object, the program causing a computer to:

generate a third moving image synthesizing the first moving image and the second moving image;

determine whether or not the first object and the second object satisfy an interference condition in the third moving image, by referencing the second object trajectory, the anterior-surface depth information of the first object, the rear-surface depth of the first object, the anterior-surface depth information of the second object and the rear-surface depth of the second object; and correct the second moving image by applying a non-deforming transformation that maintains a shape of the second object trajectory, when it is determined that the interference condition is satisfied, wherein the second object moves within the second moving image over time.

\* \* \* \* \*